United States Patent
Itou et al.

(10) Patent No.: US 8,022,650 B2
(45) Date of Patent: Sep. 20, 2011

(54) CONTROL APPARATUS OF ELECTRIC MOTOR

(75) Inventors: Ken Itou, Machida (JP); Hideaki Nakayama, Ebina (JP)

(73) Assignee: Nissan Motor Co., Ltd., Kanagawa (JP)

( * ) Notice: Subject to any disclaimer, the term of this patent is extended or adjusted under 35 U.S.C. 154(b) by 511 days.

(21) Appl. No.: 12/185,557

(22) Filed: Aug. 4, 2008

(65) Prior Publication Data

US 2009/0042688 A1    Feb. 12, 2009

(30) Foreign Application Priority Data

Aug. 9, 2007    (JP) .................. 2007-207683

(51) Int. Cl.
*H02P 7/00*    (2006.01)

(52) U.S. Cl. ............. 318/432; 318/400.15; 318/800

(58) Field of Classification Search ............. 318/400.15, 318/779, 800, 783, 788, 430, 432, 434, 471, 318/801
See application file for complete search history.

(56) References Cited

U.S. PATENT DOCUMENTS

| | | | |
|---|---|---|---|
| 5,600,215 A * | 2/1997 | Yamada et al. | 318/139 |
| 5,659,235 A * | 8/1997 | Yamada et al. | 318/801 |
| 6,272,414 B1 * | 8/2001 | Takahashi et al. | 701/54 |
| 6,339,310 B1 * | 1/2002 | Sugiyama et al. | 318/783 |
| RE39,183 E * | 7/2006 | Nada | 701/82 |
| 7,532,968 B2 * | 5/2009 | Kadota | 701/55 |
| 2002/0190683 A1 | 12/2002 | Karikomi et al. | |
| 2003/0130772 A1 * | 7/2003 | Yanagida et al. | 701/22 |

FOREIGN PATENT DOCUMENTS

| | | |
|---|---|---|
| DE | 10042338 A1 | 3/2001 |
| EP | 0610682 A1 | 8/1994 |
| JP | 62180125 A | 8/1987 |
| JP | 4156288 A | 5/1992 |
| JP | 9084208 A | 3/1997 |
| JP | 2002101693 A | 4/2002 |
| JP | 2003-009566 | 1/2003 |
| JP | 2005218226 A | 8/2005 |
| JP | 2006044536 A | 2/2006 |
| WO | 2006070266 A2 | 7/2006 |

OTHER PUBLICATIONS

Office Action in Japanese Patent Application No. 2007-207683 mailed Nov. 4, 2009 and English translation thereof (14 pages).
English Patent Abstract of JP9084208 from esp@cenet published Mar. 28, 1997 (1 page).
English Patent Abstract of JP62180125 from esp@cenet published Aug. 7, 1987 (1 page).

(Continued)

*Primary Examiner* — Walter Benson
*Assistant Examiner* — Antony M Paul
(74) *Attorney, Agent, or Firm* — Osha • Liang LLP

(57) ABSTRACT

An apparatus to control an electric motor to drive an electric-powered vehicle includes an accelerator position detector, a current controller to provide current to the electric motor through an inverter, a semiconductor device of the current controller configured to operate the inverter in response to a detected accelerator position, and a torque compensator to supply the electric motor with a modified current of the semiconductor device, wherein the torque compensator is configured to provide the modified current to the electric motor at a predetermined interval of time in response to a temperature increase in the semiconductor device when the detected accelerator position exceeds a predetermined threshold.

22 Claims, 21 Drawing Sheets

OTHER PUBLICATIONS

English Patent Abstract of JP2006044536 from esp@cenet published Feb. 16, 2006 (1 page).
English Patent Abstract of JP2002101693 from esp@cenet published Apr. 5, 2002 (1 page).
English Patent Abstract of JP2005218226 from esp@cenet published Aug. 11, 2005 (1 page).
English Patent Abstract of JP4156288 from esp@cenet published May 28, 1992 (1 page).
European Search Report for European Patent Application No. 08161803.5-2207 dated Mar. 25, 2010 (7 pages).
English Patent Abstract of DE10042338 from esp@cenet published Mar. 29, 2001 (1 page).
Chinese Office Action issued in Chinese Application No. 200810131140.7 mailed on May 17, 2011, 4 pages.

* cited by examiner

TIME [SEC]

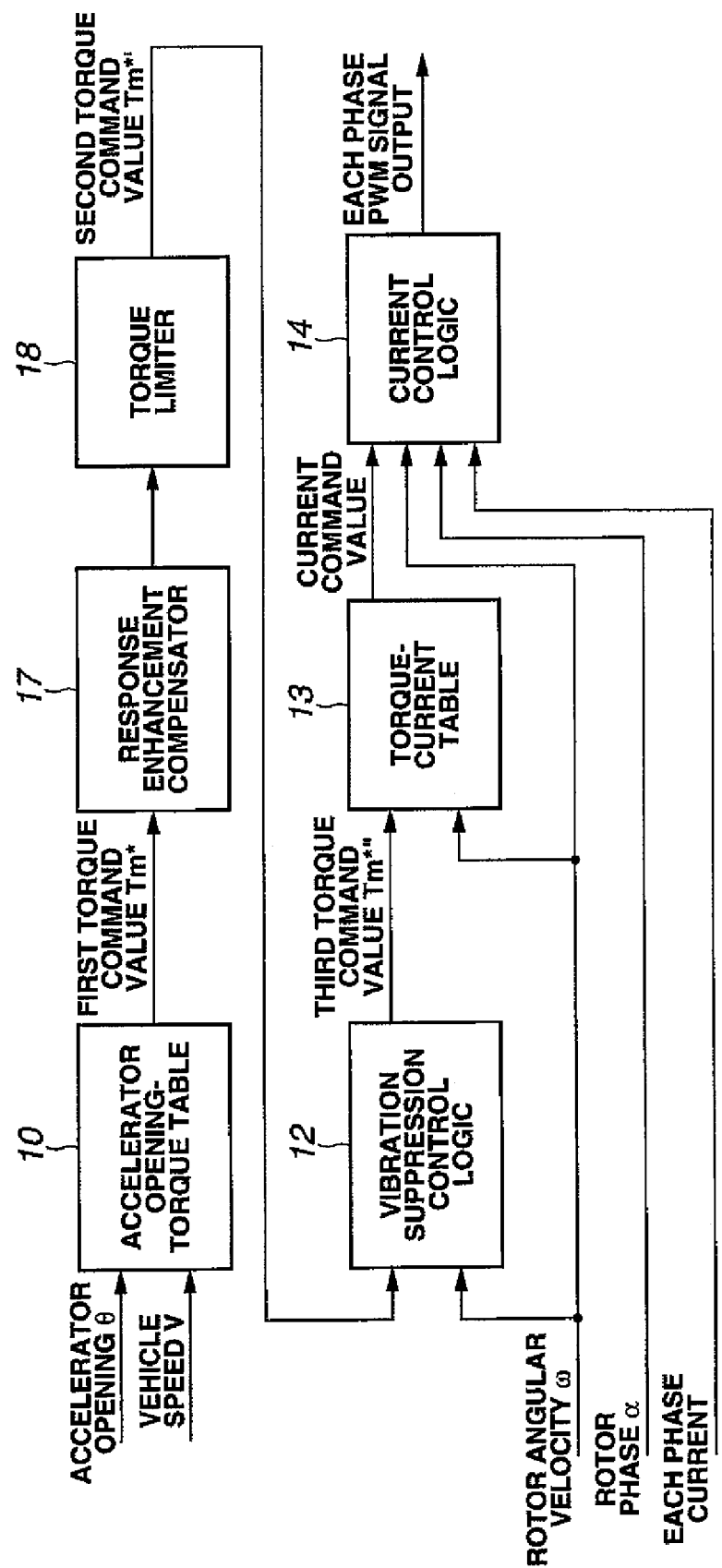

NORMAL TABLE

ENLARGEMENT TABLE

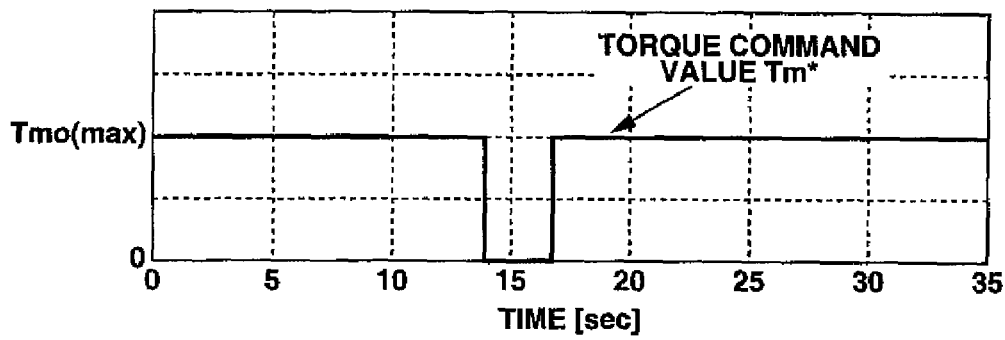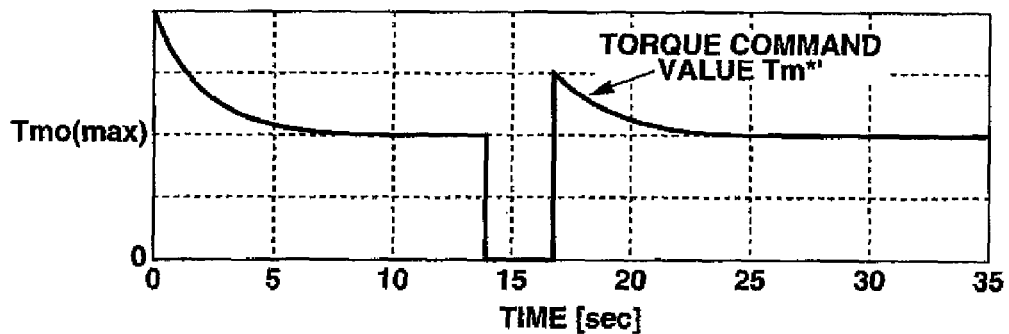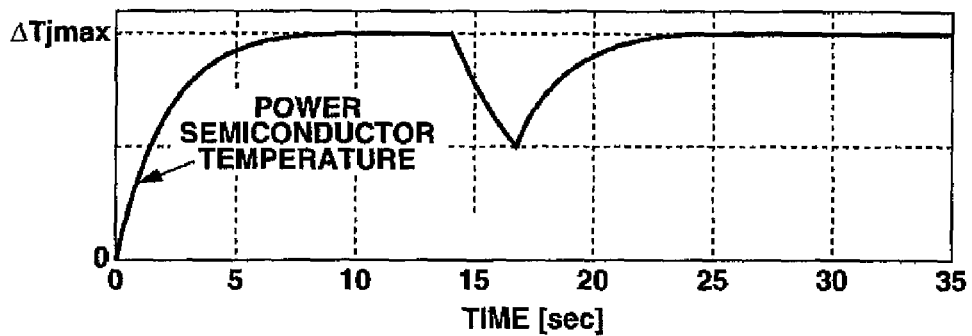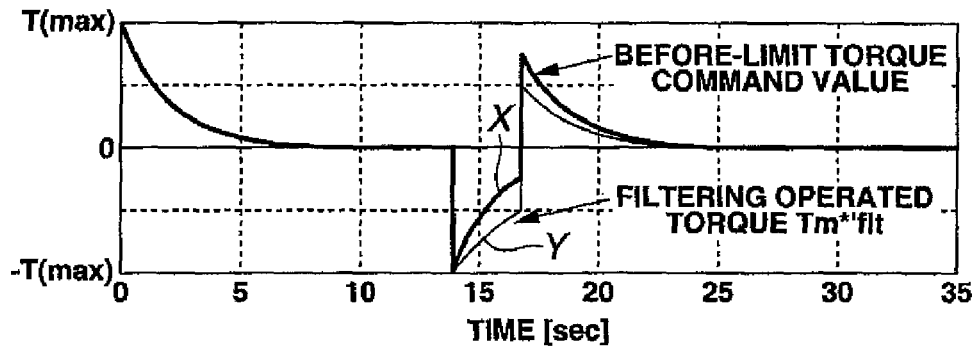

RESPONSE ENHANCEMENT COMPENSATOR

CHARACTERISTIC AT TIME OF TORQUE INCREASE, OF PRELIMINARY COMPENSATOR

CHARACTERISTIC AT TIME OF TORQUE DECREASE, OF PRELIMINARY COMPENSATOR

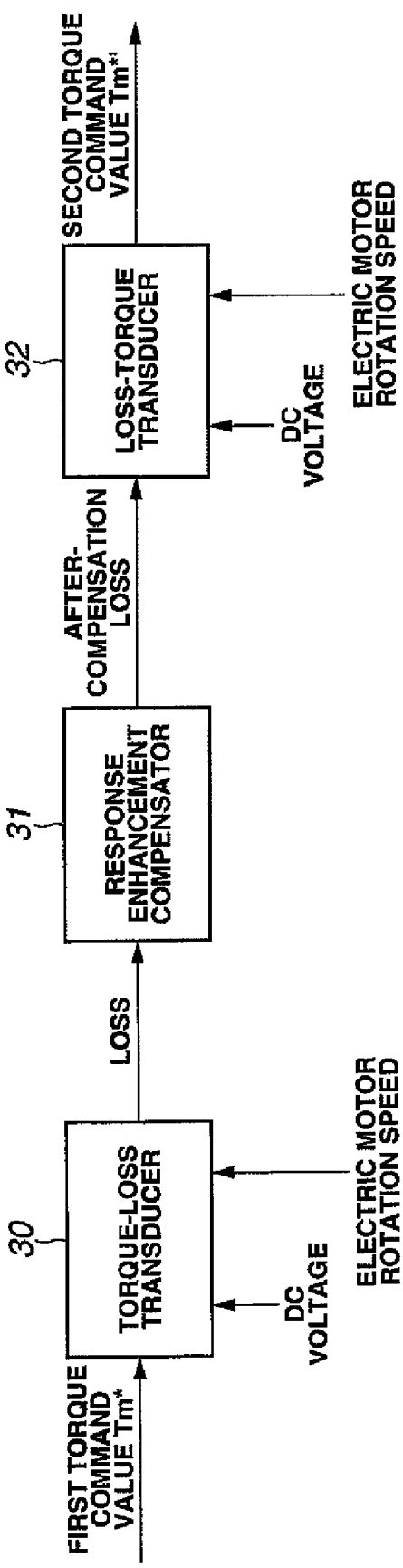

CONTROL APPARATUS OF ELECTRIC MOTOR

CROSS-REFERENCE TO RELATED APPLICATIONS

The present application claims priority from Japanese Patent Application No. 2007-207683, filed Aug. 9, 2007. The contents of the priority application are hereby incorporated by reference in their entirety.

BACKGROUND OF THE DISCLOSURE

1. Field of the Disclosure

The present disclosure relates to a control apparatus of an electric motor mounted in an electric-powered vehicle that is driven by the electric motor.

2. Description of the Related Art

A conventional apparatus to control an electric motor, for example, in an electric-powered vehicle is disclosed in Japanese Patent Provisional Publication No. 2003-009566 (hereinafter is referred to as "JP2003-009566").

SUMMARY OF THE CLAIMED SUBJECT MATTER

In one aspect, the present disclosure relates to an apparatus to control an electric motor to drive an electric-powered vehicle including an accelerator position detector, a current controller to provide current to the electric motor through an inverter, a semiconductor device of the current controller configured to operate the inverter in response to a detected accelerator position, and a torque compensator to supply the electric motor with a modified current of the semiconductor device, wherein the torque compensator is configured to provide the modified current to the electric motor at a predetermined interval of time in response to a temperature increase in the semiconductor device when the detected accelerator position exceeds a predetermined threshold.

In another aspect the present disclosure relates to a method to control an electric motor of an electric-powered vehicle including detecting an accelerator position of the vehicle, controlling a current provided to the electric motor using an inverter comprising a semiconductor device, controlling the current provided to the electric motor based upon the detected accelerator position, compensating for a torque of the electric motor by providing the electric motor with a modified current of the semiconductor device for a predetermined period of time, and fixing the predetermined period of time according to a transitional characteristic of temperature increase of the semiconductor device when the detected accelerator position increases.

In another aspect, the present disclosure relates to an apparatus to control an electric motor to drive an electric-powered vehicle including an accelerator position detection means, a current controlling means for providing current to the electric motor through an inverter, a semiconductor means of the current controlling means configured for operating the inverter in response to a detected accelerator position, and a torque compensation means for supplying the electric motor with a modified current of the semiconductor means, wherein the torque compensation means provides the modified current to the electric motor at a predetermined interval of time in response to a temperature increase in the semiconductor device when the detected accelerator position exceeds a predetermined threshold.

BRIEF DESCRIPTION OF DRAWINGS

Features of the present disclosure will become more apparent from the following description in conjunction with the accompanying drawings.

FIG. 7 is a block diagram showing a second exemplary embodiment of the present disclosure.

FIGS. 19A to 19D are characteristics showing a torque response and a change in temperature of the semiconductor device of the exemplary embodiment of FIG. 18.

FIG. 25 is a block diagram showing a tenth exemplary embodiment in accordance with the present disclosure.

DETAILED DESCRIPTION

Hereinafter, embodiments of the present disclosure will be explained in detail with reference to the drawings.

First Exemplary Embodiment

Figure 1:
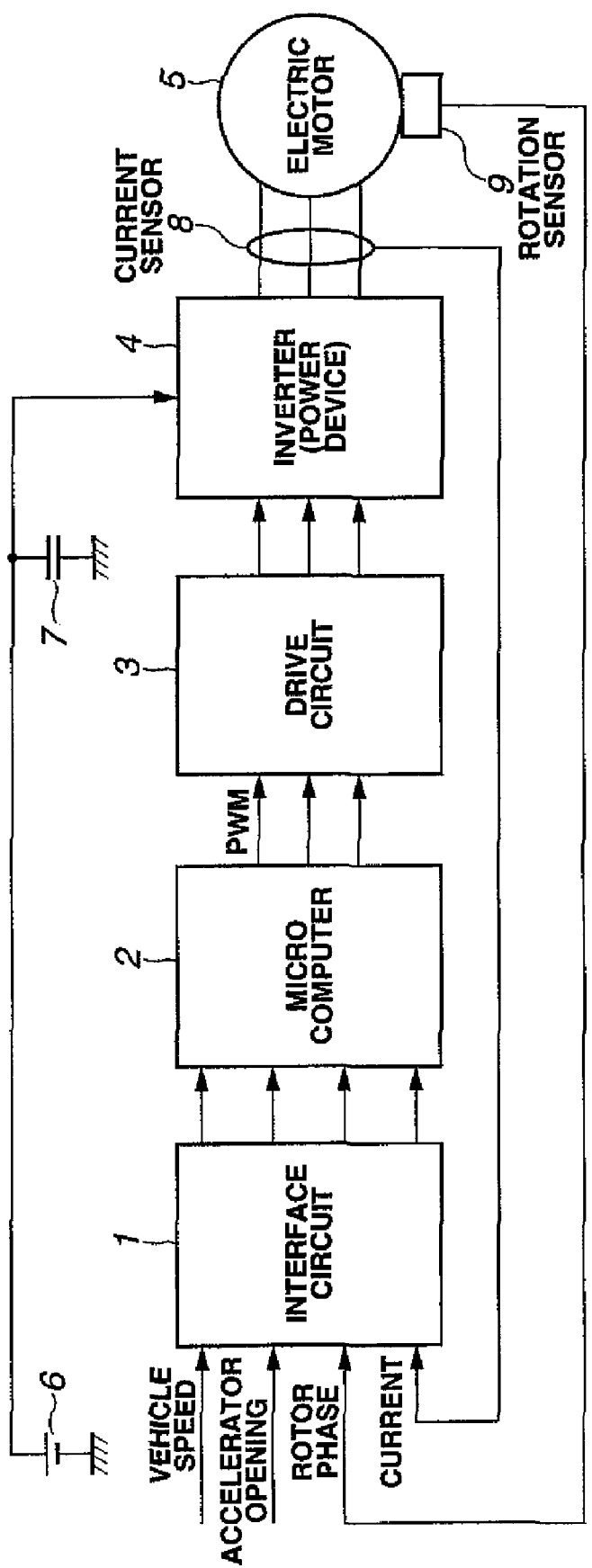
FIG. 1 is a block diagram showing an embodiment of a control apparatus of an electric motor mounted in an electric-powered vehicle in accordance with the present disclosure.

FIG. 1 is a block diagram showing an embodiment of a control apparatus of an electric motor mounted in an electric-powered vehicle. In FIG. 1, reference numeral 1 is an interface circuit. The interface circuit 1 may input (e.g., as a digital signal) each signal of vehicle operating variables, such as a vehicle speed V, an accelerator opening θ, a rotor phase α of the electric motor, and a current of the electric motor (in a case of three-phase alternating current, iu, iv and iw). While the term "accelerator opening" is used, it should be understood that for electric vehicles (as well as "drive-by-wire" internal combustion engine vehicles), the accelerator status may be characterized by an "accelerator position" rather than an "opening." Thus, the terms accelerator position and accelerator opening will be interchangeably used to refer to the status of the vehicle's accelerator at any particular time.

Reference numeral 2 is a micro computer. The micro computer 2 may generate a pulse width modulation (PWM) signal to control the electric motor according to the operating variables of each vehicle. A drive circuit 3 may generate a driving signal to drive an inverter 4 according to the PWM signal. The inverter 4 may be formed from, for example, two switching elements or devices (e.g., a power semiconductor device such as an insulated gate bipolar transistor (IGBT)) per each phase, and through opening/closing of the switching element according to the driving signal, the inverter 4 may pass or apply a desired, or "modified," current to an electric motor 5 then drives the electric motor 5. Reference numeral 6 is a DC power supply (e.g., a battery or a fuel cell) to drive the electric motor. Reference numeral 7 represents a capacitor to absorb a ripple voltage. Reference numeral 8 represents a current sensor that may detect each phase current of the electric motor. Reference numeral 9 indicates a rotation or revolution sensor (e.g., a resolver and an encoder) that may detect a rotor phase α of the electric motor.

In the control of the above electric motor, a torque command value may be determined according to the accelerator opening θ and the vehicle speed V, and the current applied to the electric motor 5 may be controlled so that a torque corresponding to the torque command value is produced.

Now, a brief explanation of a current control of a common three-phase alternating current electric motor will be described below.

Two phases iu and iv of the three phase current values that pass through the electric motor may be obtained by the current sensor 8. As for the remaining single phase iw, because a total of current values in the three phases of the three-phase alternating current is 0 (zero), the phase iw may be determined by calculation from the iu and iv. The rotor phase α [rad] of the electric motor 5 may be obtained by a rotation sensor 9, e.g., a resolver and encoder.

First, by differentiating the rotor phase α (electrical angle or degree) of the electric motor 5, a rotor angular velocity ω (electrical angle or degree) [rad/s] of the electric motor 5 may be calculated. Here, ω=dθ/dt.

Next, d-q axis current target values id* and iq* may be determined from the torque command value, the rotor angular velocity ω of the electric motor 5 and a DC voltage vdc (an output voltage of the DC power supply) with reference to a table.

Next, d-q axis current values id and iq may be calculated from the three-phase current values iu, iv and iw (where iw is determined by calculation) and the rotor phase α of the electric motor.

Next, d-q axis voltage command values vd and vq may be calculated from a deviation between the d-q axis current target values id* and iq* and the d-q axis current values id and iq. Here, a noninteracting control may be added to this part.

Next, three-phase voltage command values vu, vv and vw are calculated from the d-q axis voltage command values vd and vq and the rotor phase α of the electric motor.

Next, the PWM signal (on duty) tu [%], tv [%] and tw [%] may be calculated from the three-phase voltage command values vu, vv and vw and the DC voltage vdc (the voltage of the DC power supply).

By controlling the opening/closing of the switching element of the inverter 4 according to the PWM signal determined in this way, the electric motor 5 may be driven with a desired torque commanded by the torque command value. The control explained so far is the normal current control of the electric motor.

In this exemplary embodiment, the current may be increased by controlling the above torque command value for a predetermined period of time upon the acceleration.

Figure 2:
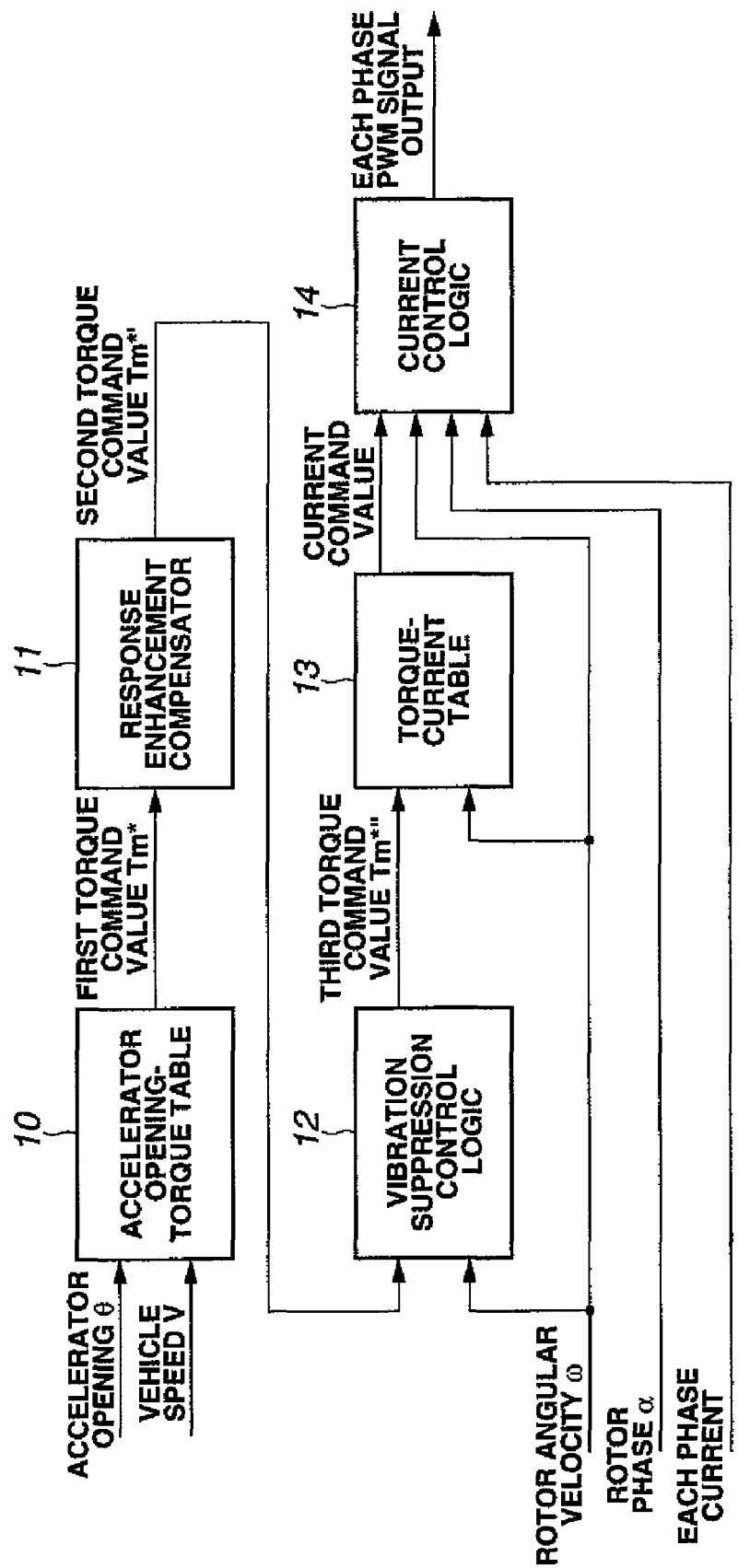
FIG. 2 is a block diagram showing a first exemplary embodiment in accordance with the present disclosure.

FIG. 2 is a block diagram showing a first exemplary embodiment of the present disclosure, and corresponds to a part of computation in the micro computer 2 of FIG. 1.

In FIG. 2, an accelerator opening-torque table 10 may set a first torque command value Tm* on the basis of the accelerator opening and the vehicle speed V. A response enhancement compensator (a compensation section) 11 may input the torque command value Tm*, and may perform a compensation operation or calculation (described later) then may output a second torque command value Tm*' that may be corrected by the compensation operation. A vibration suppression control logic 12 (described later) may input the second torque command value Tm*' and the rotor angular velocity ω, and may output a third torque command value Tm*" that may suppress torsional vibration without sacrificing a response of a driving shaft torque (a vehicle fore-and-aft acceleration). The vibration suppression control logic 12 may be removed.

Operations of a torque-current table 13 and a current control logic (a current control section) 14 may be the same as the above explained current control of the common electric motor, and the torque-current table 13 and the current control logic 14 control currents of the each phase of the electric motor so that an output torque of the electric motor corresponds to the third torque command value Tm*".

Now, a response enhancement compensator 11 will be explained below.

Figure 3:
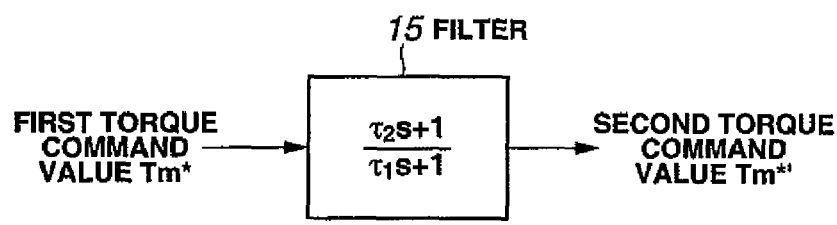
FIG. 3 is a block diagram showing an exemplary embodiment of a response enhancement compensator.

FIG. 3 is a block diagram depicting an exemplary embodiment of the response enhancement compensator. In FIG. 3, the response enhancement compensator may be configured by a filter 15 that has a first-order lag characteristic and a first-order advance characteristic. Characteristic of the filter 15 is $(\tau_2 s+1)/(\tau_1 s+1)$. By setting $\tau_1$ and $\tau_2$ to $\tau_2 > \tau_1$, the torque command value may be increased in the transitional state, and the torque command value may converge to a before-compensation value in the steady state (phase advance element). Here, $\tau_2$ may be a time constant (time constant in a transfer function of a first-order advance element) that may determine a rising of the torque command value. $\tau_1$ is a time constant (i.e., a time constant in a transfer function of a first-order lag element) that may determine an attenuation or decrease characteristic of the torque command value. That is, the second torque command value Tm*' after the correction of the compensation is temporarily increased, and after that, converges to the torque command value Tm* of the before-compensation value.

In a case where a temperature increase characteristic of the semiconductor device in FIG. 14 may be approximated by the first-order lag, its thermal time constant may be $\tau p$, a steady rated current of the semiconductor device is is (max), and a torque of a case where the rated current is passes may be a rated torque Tm0 (max). In a case where, on the assumption that the current and the torque have a proportional relationship, a peak current may be set to a value that is greater than or equal to what the rated current is and may be smaller than a breakdown current of the semiconductor device ip, the above time constants $\tau 1$ and $\tau 2$ of the filter are set to the following expression.

$$ip/is \leq \tau p/\tau 1, \text{ or } \tau 2 \leq \tau p$$

By the above setting, it may be possible to pass or apply the peak current ip that is greater than or equal to what the rated current is to the semiconductor device, and also possible to control the current so that the temperature of the semiconductor device does not exceed a heat-resistance temperature (i.e., a maximum junction temperature Tjmax). Thus, a current amplification factor, (i.e., the peak current ip/the rated current) may correspond to $\tau 2/\tau 1$.

In this case, the current passing through the semiconductor device may become the peak current at the maximum of the current, and after that, may gradually decrease with the time constant 1, then may lower until it reaches what the rated current is. Thus, a period of time when the current passing through the semiconductor device becomes greater than or equal to the rated current may be a predetermined time (e.g., a few seconds). And this time may be set by the thermal time constant $\tau p$ of the semiconductor device and the time constants $\tau 1$ and $\tau 2$ of the filter so that the temperature of the semiconductor device does not exceed the heat-resistance temperature (i.e., the maximum junction temperature Tjmax).

For example, in a case where a peak of an output maximum torque is twice as large as the rated torque Tm0 (max) (i.e., a case where it is assumed that the current and the torque have a proportional relationship), the peak current ip is twice as large as the rated current is and the time constants $\tau 1$ and $\tau 2$ of the filter 15 in FIG. 3 is set to the following:

$$\tau 1 = 0.5 \times \tau p$$

$$\tau 2 = 2 \times \tau 1 \text{ (namely, } \tau 2 = \tau p)$$

Figure 5A:
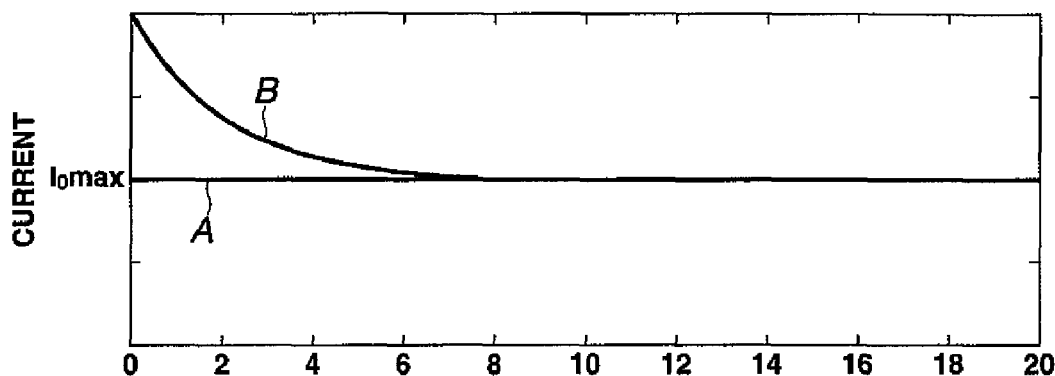
FIGS. 5A and 5B are drawings that respectively show a current response and a temperature increase characteristic when providing a step torque commend value.
Figure 5B:
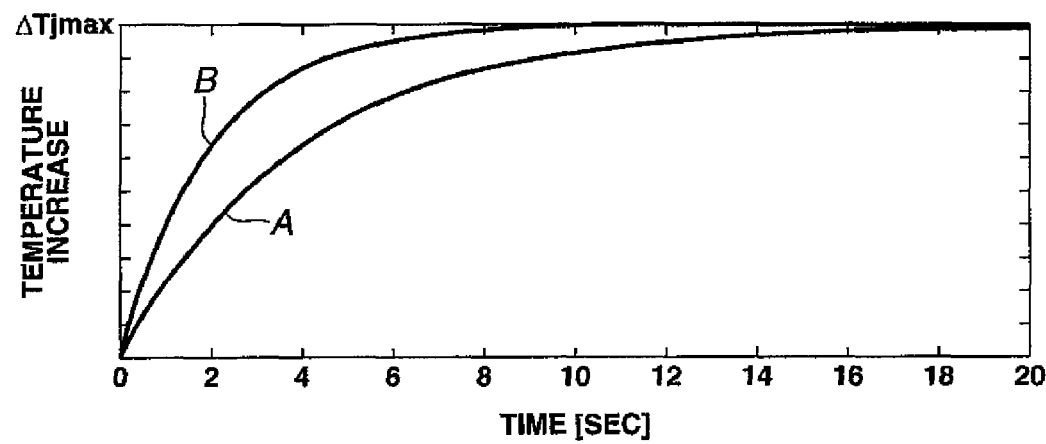
Figure 6A:
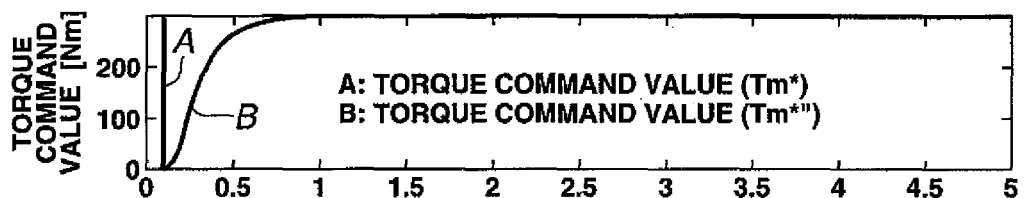
FIGS. 6A to 6D are characteristics showing each operating variable of a vehicle at a time of a sudden increase in torque.
Figure 6B:
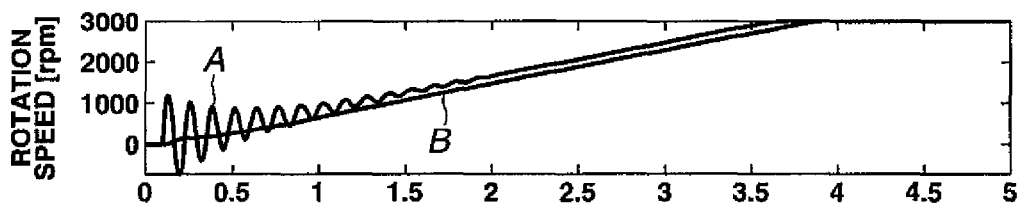
Figure 6C:
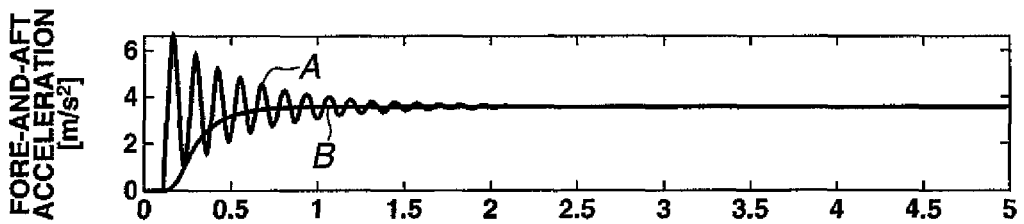
Figure 6D:
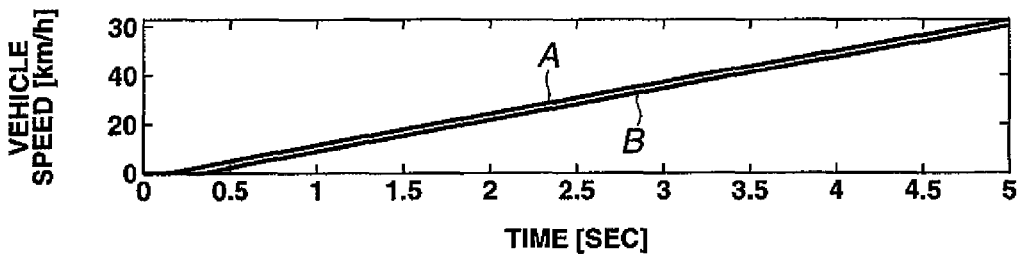
Figure 8A:
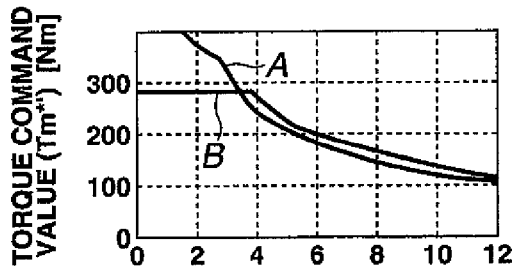
FIGS. 8A to 8F are drawings of characteristics showing comparison of effect between the exemplary embodiment of FIG. 7 and a conventional case.
Figure 8B:
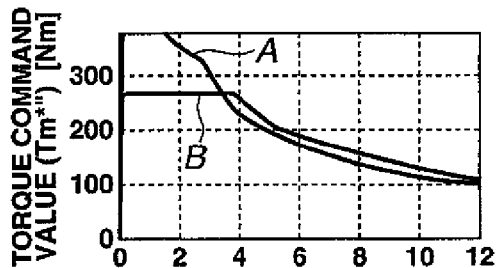
Figure 8C:
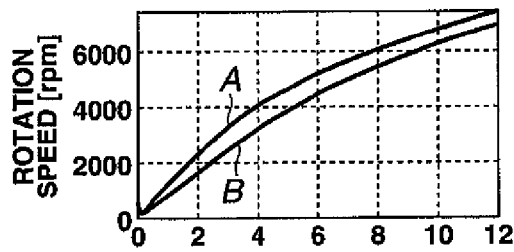
Figure 8D:
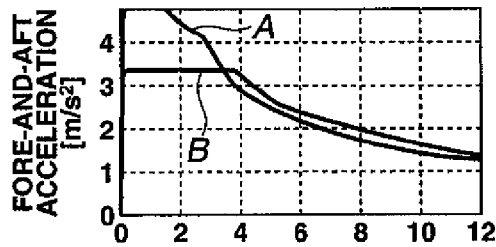
Figure 8E:
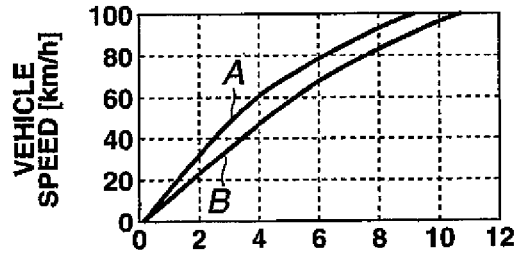
Figure 8F:
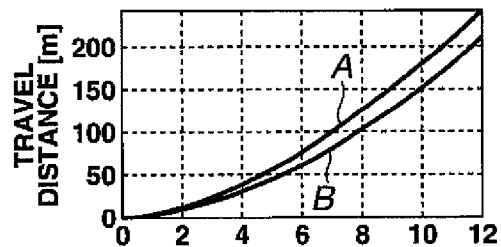

In FIGS. 5A and 5B, a current response and a temperature increase characteristic of the semiconductor device when setting the time constants $\tau 1$ and $\tau 2$ to the above condition and providing a step torque commend value, are illustrated. In FIGS. 5A and 5B, A is a characteristic without the compensation, B is a characteristic with the compensation. Condition of this example is the following:

$$\tau p = 4 \text{ sec}$$

$$\tau 1 = 2 \text{ sec}$$

$$\tau 2 = 4 \text{ sec}$$

As is seen from the characteristics of FIGS. 5A and 5B, despite the fact that the peak current passing through the semiconductor device is twice as large as a steady-state value, a maximum of the temperature is the same as a case of no compensation. Through such a setting, it may be possible to increase the torque within a permissible or allowable temperature range of the semiconductor device in the transitional state. Here, in FIGS. 5A and 5B, a time required for the characteristic B having risen to the peak current to decrease gradually and lower up to the characteristic A is the predetermined time.

However, in a case of an actual electric motor, when the current becomes great, the relationship between the current and torque may be nonlinear by the influence of magnetic saturation. For example, even if a current I0 passing through the semiconductor device is set to a value that is twice as large as the rated current is (max), there may be a case where an actual output peak torque is only 1.8 times as large as the rated torque Tm0 (max). In such a case, if the maximum peak torque is set so that it becomes twice as large as the rated torque Tm0 (max), the peak current may exceed twice the rated current is (max), and there may be a risk that the temperature of the semiconductor device will exceed the allowable temperature range.

Figure 4:
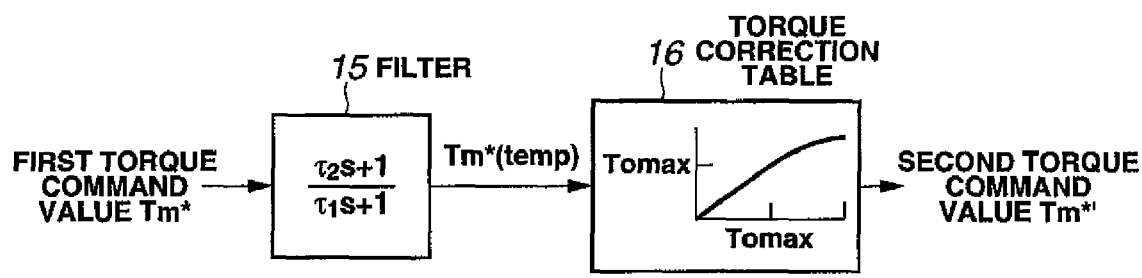
FIG. 4 is a block diagram showing another exemplary embodiment of the response enhancement compensator.

FIG. 4 is a block diagram depicting the other exemplary embodiment of the response enhancement compensator, which is a configuration of an improved response enhancement compensator for solving the above problem. In FIG. 4, reference numeral 16 is a torque correction table that may be set on the basis of a current-torque characteristic of the electric motor. The torque correction table 16 may be connected to a stage subsequent to the same filter 15 in FIG. 3.

For example, in the above case (where current=2×i0 (max), torque=1.8×Tm0 (max)), the torque correction table 16 may be set so that the second torque command value Tm*' passing through the filter 15 having the first-order lag characteristic and the first-order advance characteristic becomes Tm*'≦1.8×Tm0 (max). By adding such a correction, the peak current does not exceed twice the rated current is (max).

As a matter of course, it may also be possible that the configuration of FIG. 3 exhibits the same effect as the above description by a setting of the constants of the filter 15. For example, in the above case (where current=2×is (max), torque=1.8×Tm0 (max)), if $\tau p$=4 sec and $\tau 1$=2 sec, $\tau 2$ is set to $\tau 2 \leq 3.6$ sec. Through this setting, the peak current may be suppressed within twice the (max), and the temperature of the semiconductor device may be held within the allowable temperature range.

As described above, when the time constant of the case where the temperature increase characteristic of the semiconductor device is approximated by the first-order lag is $\tau p$ and the characteristic of the filter 15 is $(\tau 2 s+1)/(\tau 1 s+1)$, by setting these to the following condition:

(the peak current/the rated current)$\leq \tau p/\tau 1$, or $\tau 2 \leq \tau p$, it is possible to keep the temperature of the semiconductor device within the allowable temperature range.

Now, a vibration suppression control of the vibration suppression control logic 12 in FIG. 2 will be explained.

In the electric-powered vehicle in which the electric motor is directly connected to a driving wheel through a gear, when rapidly increasing the torque of the electric motor, there may be a possibility that a hard jerky vibration will occur due to torsion resonance of a power train (driving torque line). FIGS. 6A to 6D are characteristics showing each operating variable of the vehicle at a time of a sudden increase in torque (in a state in which an accelerator pedal is abruptly depressed). As the torque command value Tm* sharply rises as shown by a line A in FIG. 6A, the fore-and-aft acceleration of the vehicle and a rotation or revolution speed widely oscillate or vibrate as shown by curves A in FIGS. 6B and 6C, then the jerky vibration occurs.

In order to prevent the jerky vibration caused by the torsion resonance, normally, on the basis of the second torque command value Tm*' (a curve B) obtained by providing a process of rate-limiting or low-pass-filtering to the torque command value Tm* that may be determined by the accelerator opening and the vehicle speed, the control is carried out. Then the jerky vibration may be prevented. In this case, although the jerky vibration is prevented, because the rising of the torque command value may become slow, the acceleration of the vehicle may deteriorate or become worse.

For this reason, the applicant has provided a vibration suppression control apparatus which is capable of suppressing the jerky vibration without using the rate-limit or low-pass-filter and preventing deterioration of the acceleration performance in a patent document (Publication JP2003-009566: Patent Registration 3508742).

In this disclosure, a motor rotation angle sensor 1 that detects a rotation speed data of the motor, a motor torque setting section 3 that sets a first torque target value T*, a vibration suppression controlling section 4, and a motor torque controlling section 5 may be provided. The vibration suppression controlling section 4 may have a control block 13 that has a transfer characteristic of Gp (s), a subtracter 14 that determines a deviation between an output of the control block 13 and the motor rotation speed, and a control block 15 that has a transfer characteristic of H (s)/Gp (s). Here, a difference of H (s) between a denominator order and a numerator order may be set to be greater than or equal to a difference of Gp (s) between a denominator order and a numerator order. With this configuration, even in a vehicle stop state or in a case where the accelerator pedal is depressed from a deceleration state, a vibration suppressing effect may be ensured. The vibration suppression control logic 12 in FIG. 2 may be the same as the vibration suppression control apparatus described in JP2003-009566 (Patent Registration 3508742).

Second Exemplary Embodiment

With the above described configuration, although the acceleration response at the time of acceleration ON may be improved by increasing the torque in the transitional state, if the torque in the transitional state is increased too much, there is a risk that wheel spin may occur beyond a gripping limit of the driving wheel (the limit of adhesion).

FIG. 7 is a block diagram depicting a second exemplary embodiment of the present disclosure, which solves the above problem. As shown, a limiter 18 that limits the torque is provided in a stage subsequent to a response enhancement compensator 17. The operation of the response enhancement compensator 17 may be that of FIG. 3 or FIG. 4.

For example, In FIG. 7, in a front drive vehicle, when a steady front load or weight distribution is α, a vehicle equivalent mass is M, a wheelbase is L, a height of gravitational center is H, a load radius of the driving wheel is r, an overall gear ratio between the electric motor and the driving wheel is N, an efficiency of the driving torque line is η, a gravitational acceleration is g, and the gripping limit is μ=1, expressed in conversion of coefficient of friction between road surface and a tire, an upper limit Tm (max) of the electric motor torque command value may be determined as follows;

$$Tm(\max) = \alpha^* \times M^* \times g^* \times r \times (1/N) \times (1/\eta) \times [1/(1+H/L)]$$

As a matter of course, not this open-loop limiter, for instance, by detecting wheel speeds of driving and driven wheels and detecting a slip of the driving wheel from a difference of the wheel speed between the both wheels, the torque may be controlled using a feedback control such as a traction control.

FIGS. 8A to 8F are drawings of characteristics showing comparison of effect between the exemplary embodiment of FIG. 7 (using the vibration suppression control of JP2003-009566) and a conventional case (where the response enhancement compensator 17 and the limiter 18 in FIG. 7 are removed). Here, as the response enhancement compensator 17, the configuration of FIG. 4 is used. In FIG. 8, A is a characteristic of this embodiment, B is a characteristic of the conventional case.

This example of the characteristic illustrates an acceleration performance of a case where the electric-powered vehicle is fully accelerated from the stopped state, when a peak current amplification factor (τ2 /τ1) in the transitional state is set to 2 and a peak torque amplification factor in the transitional state is set to 1.8. As a matter of course, in the case of this setting, the temperature of the semiconductor device may not exceed the allowable temperature range.

As is clear from FIGS. 8A to 8F, by using this embodiment, the fore-and-aft acceleration instantaneously reaches the gripping limit (about 4.8 m/s2), and a 0-100 km/hr time may be shortened by approximately 1.5 seconds. Further, by using the vibration suppression control of JP2003-009566 in combination, although the acceleration may be increased in the transitional state, jerky vibration does not occur.

Third Exemplary Embodiment

Figure 9A:
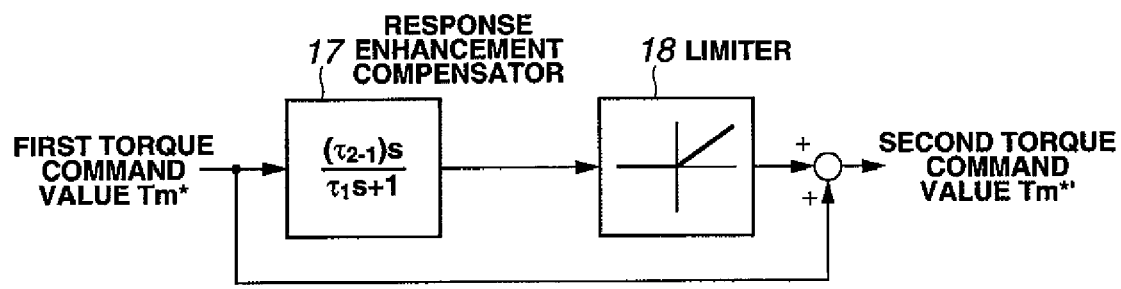
FIGS. 9A and 9B are block diagrams showing a third exemplary embodiment in accordance with the present disclosure.
Figure 9B:
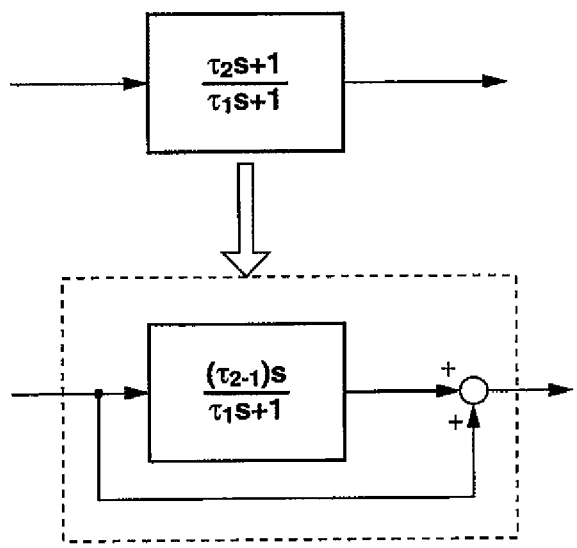

FIGS. 9A and 9B are block diagrams depicting a third exemplary embodiment in accordance with the present disclosure.

In the above described embodiments, although they have the effect of improving the response at the time of acceleration, the same effect arises at a time of deceleration as well. The deceleration may become too great at the time of acceleration OFF, and there may arise a vehicle behavior such that an occupant is thrust forward.

Accordingly, as shown in FIG. 9A, the limiter 18 is provided in the stage subsequent to the response enhancement compensator 17, and also an add value generated by adding the before-compensation first torque command value Tm* to an output of the limiter 18 becomes an after-compensation second torque command value Tm*'. With this setting, in a case where the torque command value Tm* is put in an increasing direction, that is, at the time of acceleration ON, the same torque amplification effect as FIG. 4 may be obtained. In a case where the torque command value Tm* is put in a decreasing direction, that is, at the time of acceleration OFF, no compensation operation is carried out.

FIG. 9B depicts an equivalent circuit of a case where a filter (e.g., 15 of FIG. 3) having the first-order lag characteristic and the first-order advance characteristic, used as the response enhancement compensator 17, and an adder are combined with each other. As shown in FIG. 9B, when the filter (τ2s+1)/(τ1s+1) of the first-order lag characteristic and the first-order advance characteristic and the adder are combined with each other and also the characteristic of the filter is (τ2−1)s/(τ1s+1), the circuit whose output is the add value generated by adding input and output of the filter may become the same as the characteristic (τ2s+1)/(τ1s+1) of the filter 15 of FIG. 3. Thus, the circuit of FIG. 9A may have the characteristic equivalent to the circuit in which the limiter 18 is connected to the stage subsequent to the filter 15 of FIG. 3, and also is configured to gain the torque amplification effect only in the case where the torque command value Tm* is put in the increasing direction. Here, the numerator (τ2−1)s in FIGS. 9A and 9B is an abbreviation form of (τ2−τ1)s. Thus, correctly, the operation of the response enhancement compensator 17 in FIG. 9A may be represented as follows.

$$(\tau 2-\tau 1)s/(\tau 1s+1)$$

The abbreviation form is used in other drawings (from FIGS. 9A and 9B) as well.

Fourth Exemplary Embodiment

Figure 10:
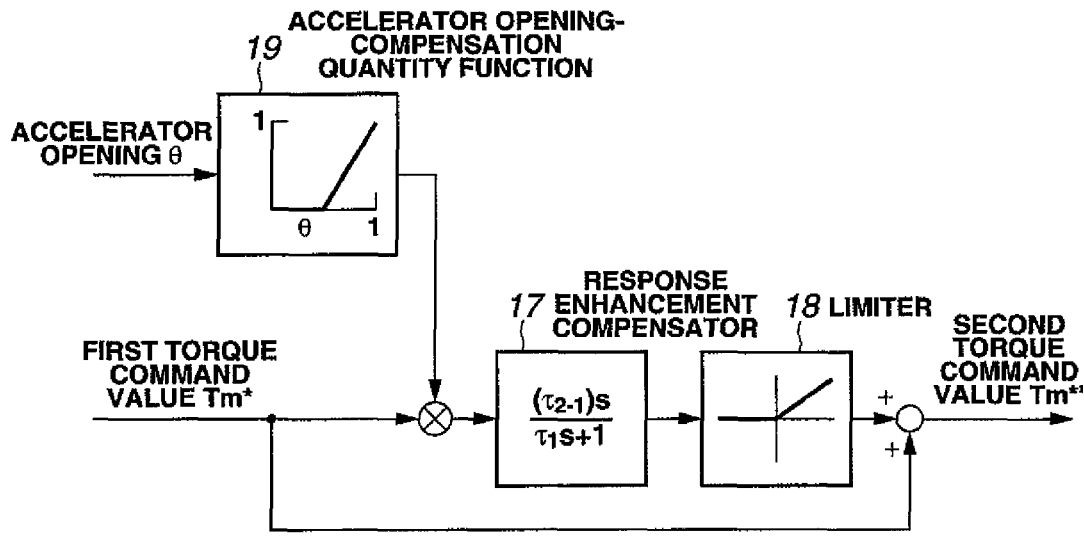
FIG. 10 is a block diagram showing a fourth exemplary embodiment in accordance with the present disclosure.

FIG. 10 is a block diagram depicting a fourth exemplary embodiment in accordance with the present disclosure. This exemplary embodiment may be configured to adjust a compensation quantity in accordance with the accelerator opening. An accelerator opening-compensation quantity function table 19 is a table that stores a relationship between the accelerator opening and the compensation quantity, and its characteristics may be set so that as the accelerator opening becomes greater, the compensation quantity increases. With this configuration, it may be possible that, as the accelerator opening becomes greater, the compensation quantity increases.

For example, when the accelerator opening is small, the compensation quantity may be decreased (or is set to 0 (zero)) then a gentle or moderate characteristic may be obtained, and when the accelerator opening is great, by increasing the compensation quantity, the acceleration performance is improved, then the characteristic that the driver desires is obtained.

Fifth Exemplary Embodiment

Figure 11:
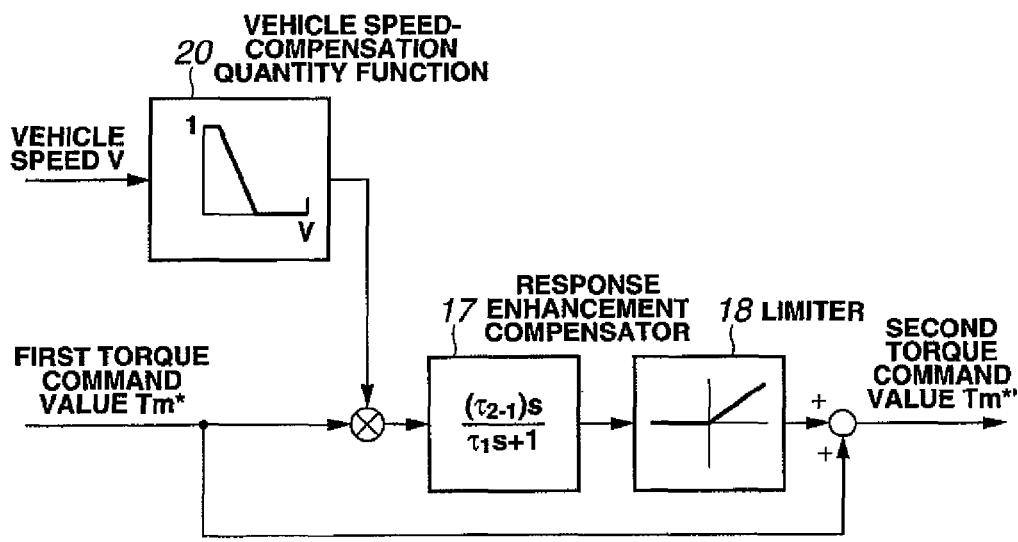
FIG. 11 is a block diagram showing a fifth exemplary embodiment in accordance with the present disclosure.

FIG. 11 is a block diagram depicting a fifth exemplary embodiment in accordance with the present disclosure. This exemplary embodiment may be configured to adjust the compensation quantity in accordance with the vehicle speed. A vehicle speed-compensation quantity function table 20 is a table that sets the compensation quantity to be great in a middle or low speed range and to be small in a high speed range. In this configuration, an amplification quantity may be great in the middle or low speed range, and brisk feeling is increased. Further, in the high speed range, the amplification quantity may be decreased (or become 0 (zero)) so that stability is enhanced. Thus the characteristic according to the vehicle driving condition may be obtained. As a matter of course, it may also be possible to combine the both configurations of FIGS. 10 and 11.

Sixth Exemplary Embodiment

In the above embodiments explained so far, the configuration in which the compensation is made with a dimension of the torque by determining the torque command value Tm* first from the accelerator opening θ, has been explained. However, there may also be a case where the compensation is made with a dimension of the accelerator opening (e.g., the accelerator pedal position) itself so that substantially the same effect may be obtained.

Figure 12:
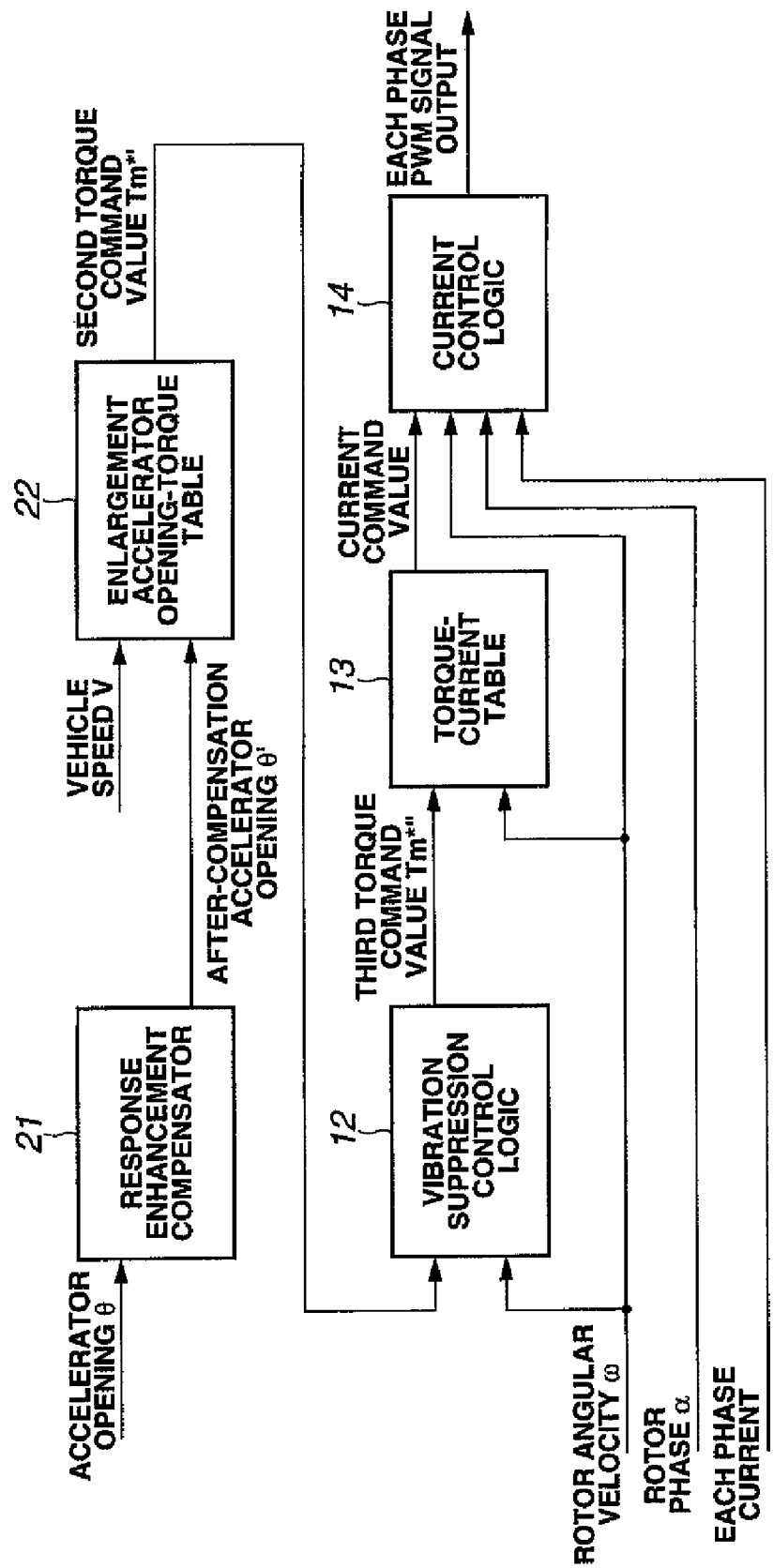
FIG. 12 is a block diagram showing a sixth exemplary embodiment in accordance with the present disclosure.

FIG. 12 is a block diagram depicting a sixth exemplary embodiment in accordance with the present disclosure illustrating a configuration that compensates for or corrects the accelerator opening.

In FIG. 12, an input accelerator opening θ is provided to a response enhancement compensator 21, and the compensation operation may be performed to the accelerator opening θ itself. As the response enhancement compensator 21, the compensators shown in FIGS. 4, 9, 10 and 11 may be used. An after-compensation accelerator opening θ' and an input vehicle speed V may be provided to an enlargement accelerator opening-torque table 22, and the torque command value may be calculated at this point. In this case, because the accelerator opening may be the after-compensation accelerator opening θ', the torque command value output from the enlargement accelerator opening-torque table 22 may be an after-compensation second torque command value Tm*'.

Figure 13A:
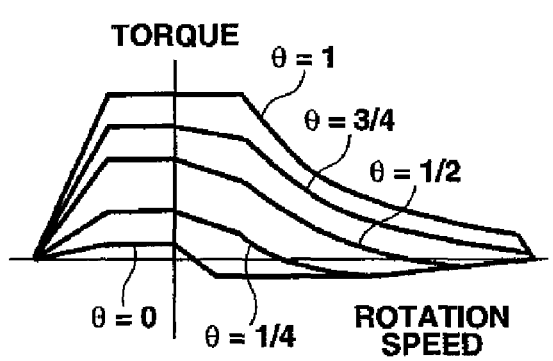
FIGS. 13A and 13B are drawings showing a comparison of one of characteristics between an enlargement accelerator opening-torque table and a normal accelerator opening-torque table.
Figure 13B:
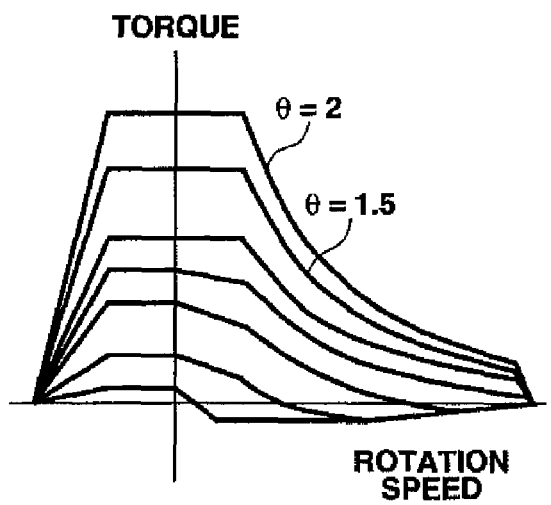
Figure 14A:
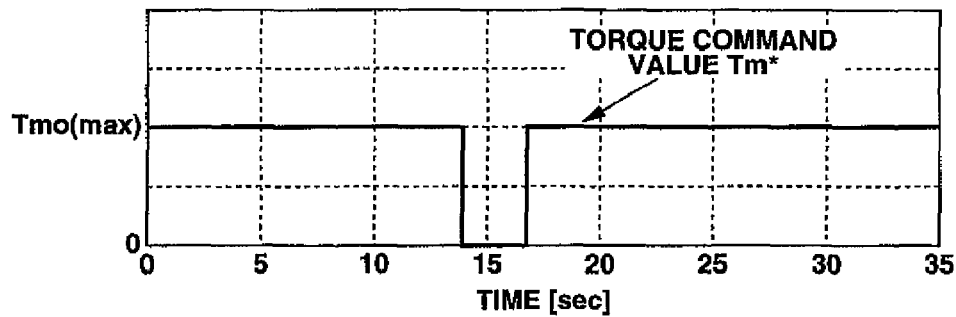
FIGS. 14A to 14D are characteristics showing a torque response and a change in temperature of the semiconductor device of a case where a temperature of the semiconductor device exceeds a maximum junction temperature Tjmax.
Figure 14B:
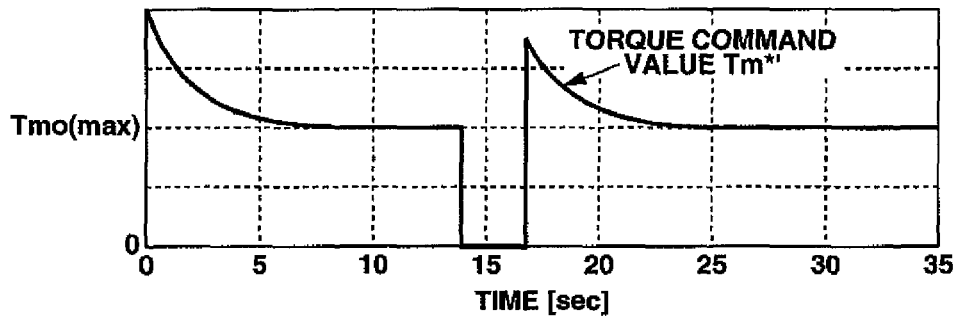
Figure 14C:
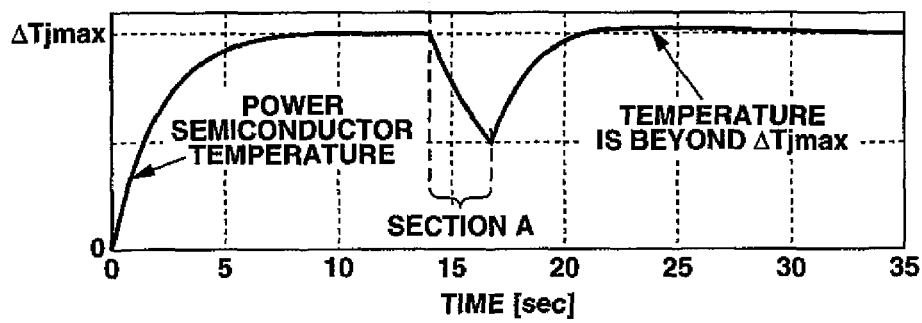
Figure 14D:
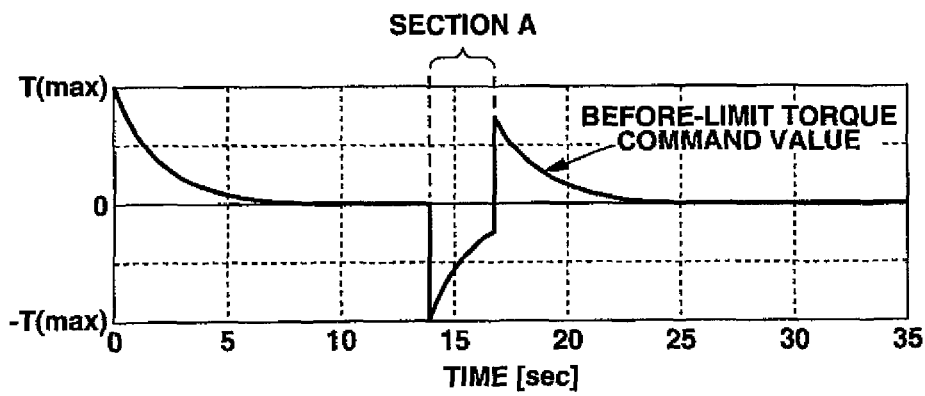

Here, when the accelerator opening θ is 0 (zero) at a fully-closed opening and is 1 at a fully-open opening, the after-compensation accelerator opening θ' is beyond 1. Thus, in the enlargement accelerator opening-torque table 22, a range of the accelerator opening θ is enlarged as compared with the normal accelerator opening-torque table in accordance with the compensation quantity. FIGS. 13A and 13B are drawings depicting a comparison of one of characteristics between the enlargement accelerator opening-torque table 22 and the normal accelerator opening-torque table.

Seventh Exemplary Embodiment

Next, a seventh exemplary embodiment will be explained.

As described above, the occurrence of the vehicle behavior such that the occupant leans forward resulting from excessive deceleration at the time of acceleration OFF, is taken into account. With the configuration like FIGS. 9A and 9B, when the torque command value Tm* is put in the increasing direction, that is, at the time of acceleration ON, the torque compensation may be performed, and when the torque command value Tm* may be put in the decreasing direction. That is, at the time of acceleration OFF, no compensation operation is carried out. However, in this case, there may be a case where the temperature of the semiconductor device may exceed the maximum junction temperature Tjmax in accordance with the condition.

FIGS. 14A to 14D are characteristics showing a torque response and a change in temperature of the semiconductor device of the case where the temperature of the semiconductor device exceeds the maximum junction temperature Tjmax. From the top in the drawings, the first torque command value Tm*, the second torque command value Tm*', the temperature of the semiconductor device, and a before-limit torque command value (the output of the response enhancement compensator 17), are illustrated. Here, in the following description, on the assumption that the torque command value Tm* and the current I0 have the proportional relationship, the explanation may be performed using the torque command value.

In a case where the output of the response enhancement compensator 17 reaches a limit value of the limiter 18 in the configuration of the above FIG. 9, the second torque command value Tm*' agrees with the first torque command value Tm*. At this time, on the assumption that a temperature decrease characteristic of the semiconductor device may be approximated by the first-order lag, same as the temperature increase characteristic, when the thermal time constant τp is τp=4 sec, the temperature of the semiconductor device may change with a characteristic as shown by a section A in FIG. 14C. That is, from a point when the first torque command value Tm* becomes 0 (zero) (also the second torque command value Tm*' becomes 0), the temperature of the semiconductor device may decrease with the thermal time constant τp as shown in the section A of FIG. 14C.

On the other hand, although an output T (a before-limit torque command value) of the response enhancement compensator 17 of FIG. 9 may decrease rapidly at a point when the first torque command value Tm* becomes 0 (zero) and after that may increase, because the time constant τ1 of this increase is smaller than the thermal time constant τp of the semiconductor device, the output T may increase faster than the temperature change of the semiconductor device. If the torque command value Tm* is put in the increasing direction and the compensation operation is performed again in this condition, because an extra compensation operation is performed, the temperature of the semiconductor device may exceed the maximum junction temperature Tjmax. That is, if the torque command value is set to the great value by the compensation of the increasing direction during a time period when the temperature of the semiconductor device is in the middle of the decrease and still high, there may be a risk that the temperature of the semiconductor device will exceed a rated temperature.

Figure 15:
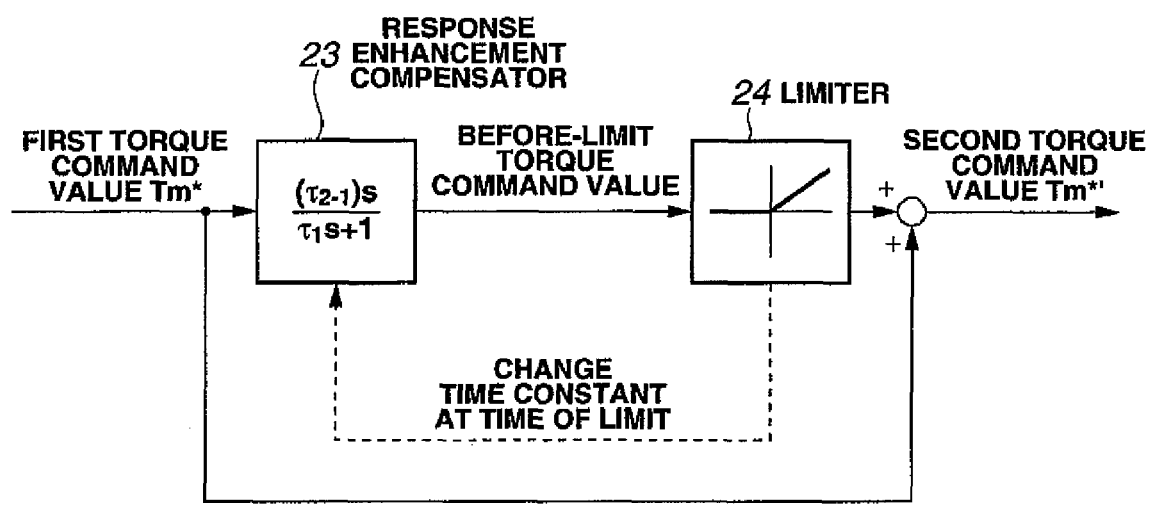
FIG. 15 is a block diagram showing a seventh exemplary embodiment in accordance with the present disclosure.

FIG. 15 is a block diagram depicting a seventh exemplary embodiment in accordance with the present disclosure, which illustrates a configuration that solves the above problem and prevents the temperature of the semiconductor device from exceeding the maximum junction temperature Tjmax completely when limiting the compensation for the torque or the current to only a positive side.

In FIG. 15, although a response enhancement compensator 23 may be the same as the response enhancement compensator 17 of FIG. 9, the time constant may change to a variable time constant so that the output of the response enhancement compensator changes with the same time constant as the temperature change of the semiconductor device at a time of the limit. This point is different. That is, in a case where the output of the response enhancement compensator 23 reaches a limit value of a limiter 24, by setting the time constant of the response enhancement compensator 23 to the same time constant as the temperature decrease characteristic of the semiconductor device, a change speed of a before-limit torque command value T may be gentle or moderate, then when the torque command value Tm* is put in the increasing direction again, a maximum value of the before-limit torque command value T may be prevented from being too great.

FIGS. 16A to 16D are characteristics showing the above condition. From the top in the drawings, the first torque command value Tm*, the second torque command value Tm*', the temperature of the semiconductor device, and the before-limit torque command value (the output of the response enhancement compensator 23), are illustrated.

Figure 16A:
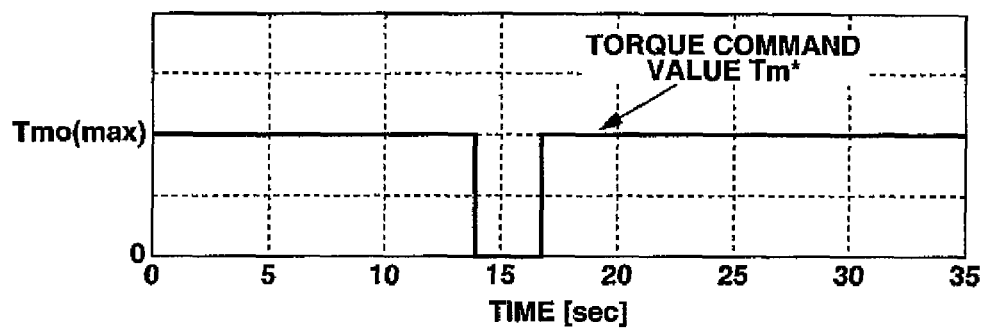
FIGS. 16A to 16D are operating characteristics of the exemplary embodiment of FIG. 15.
Figure 16B:
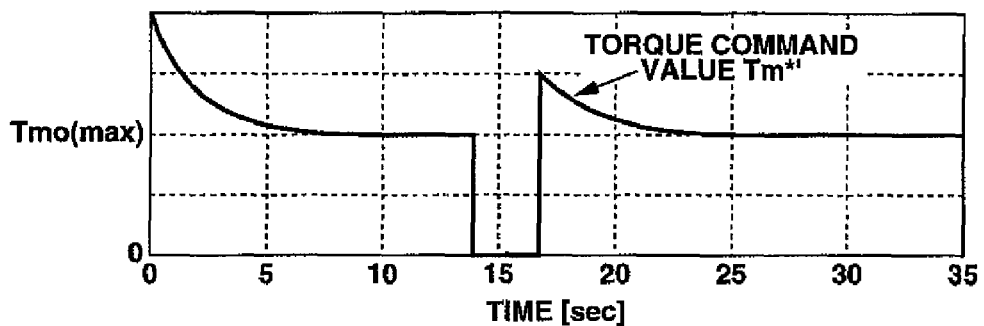
Figure 16C:
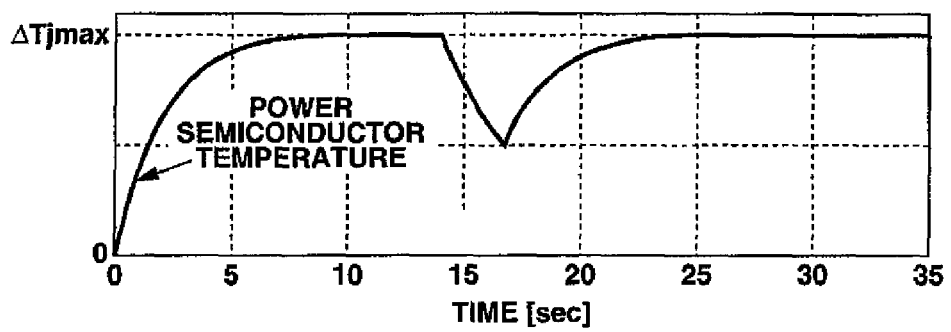
Figure 16D:
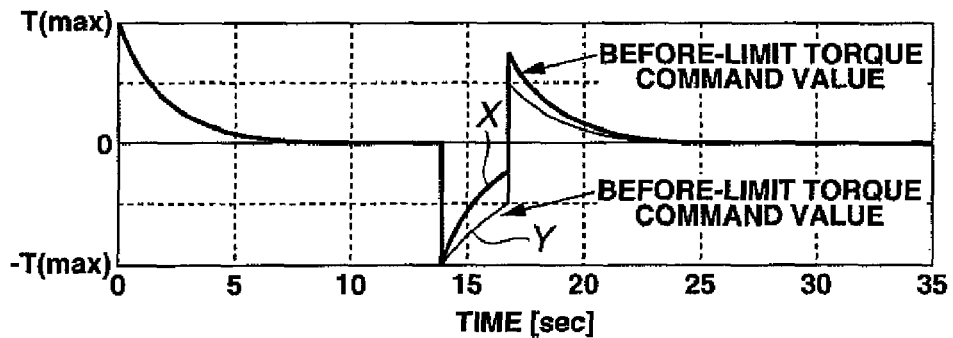

In FIG. 16D, in the case of the configuration of FIG. 9, the output (the before-limit torque command value T) of the response enhancement compensator 17 may change as shown by a thick line X. On the other hand, in the ease of the configuration of FIG. 15, it may change as shown by a thin line Y. That is, because the output of the response enhancement compensator 23 may gently increase with the same time constant as the temperature decrease characteristic of the semiconductor device, when the torque command value Tm* is put in the increasing direction again, the torque command value T may be prevented from being too great.

Figure 17:
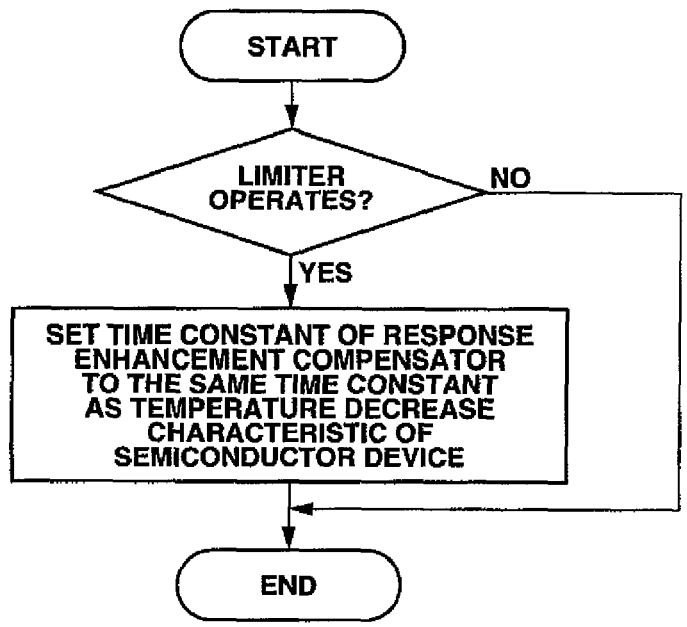
FIG. 17 is a flow chart of computation of the exemplary embodiment of FIG. 15.

FIG. 17 is a flow chart of the operation when executing the above control. As shown in FIG. 17, a judgment is made as to whether or not the output of the response enhancement compensator 23 is limited by the limiter (reaches the limit value of the limiter 24). If the output is limited by the limiter, the time constant of the response enhancement compensator 23 may be set to the same time constant as the temperature decrease characteristic of the semiconductor device.

Eighth Exemplary Embodiment

Figure 18:
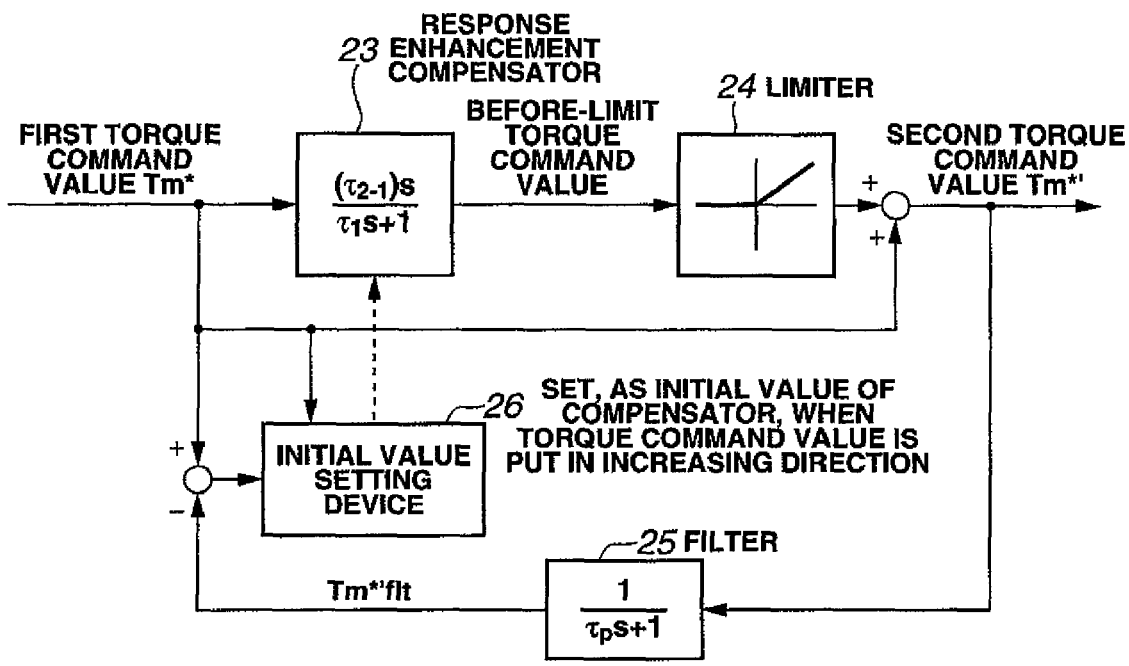
FIG. 18 is a block diagram showing an eighth exemplary embodiment in accordance with the present disclosure.

Next, FIG. 18 is a block diagram showing an eighth exemplary embodiment in accordance with the present disclosure, which is another configuration that may prevent the temperature of the semiconductor device from exceeding the maximum junction temperature Tjmax by limiting the compensation for the torque or the current to only the positive side.

In FIG. 18, a filter 25 performs a filtering process, equivalent to a temperature characteristic model of the semiconductor device, to an after-limit torque command value Tm*'. Here, a first-order lag filter of time constant τpc=4 sec may be used. Further, an initial value setting device 26 may be a device that sets a difference between an output Tm*'flt of the filter 25 and the torque command value Tm* as an initial value (an initial value upon compensation) of the response enhancement compensator 23 when the torque command value Tm* is put in the increasing direction again.

In FIG. 18, by using, as the initial value of the response enhancement compensator 23, the difference between the output Tm*'flt obtained by the filtering operation, equivalent to the temperature characteristic model of the semiconductor device, of the torque command value Tm*' that may pass through the limiter 24 and the torque command value Tm* when the torque command value Tm* is put in the increasing direction again, because the initial value of the response enhancement compensator 23 may be fitted to the temperature of the semiconductor device, when the torque command value Tm* is put in the increasing direction again, the torque command value may be prevented from being too great. And thus, the temperature of the semiconductor device may be prevented from exceeding the maximum junction temperature Tjmax.

FIGS. 19A to 19D are characteristics showing a torque response and a change in temperature of the semiconductor device of the case of FIG. 18, with comparison to the configuration FIG. 9. From the top in the drawings, the first torque command value Tm*, the second torque command value Tm*', the temperature of the semiconductor device, and the before-limit torque command value (the output of the response enhancement compensator 23), are illustrated.

In FIG. 19D, in the case of the configuration of FIG. 9, the output (the before-limit torque command value T) of the response enhancement compensator 17 changes as shown by a thick line X. On the other hand, in the case of the configuration of FIG. 18, it changes as shown by a thin line Y. That is, because the initial value of the response enhancement compensator 23 when the torque command value Tm* may be put in the increasing direction again is set to fit the temperature characteristic of the semiconductor device then has been a low value, the torque command value may be prevented from being too great.

Figure 20:
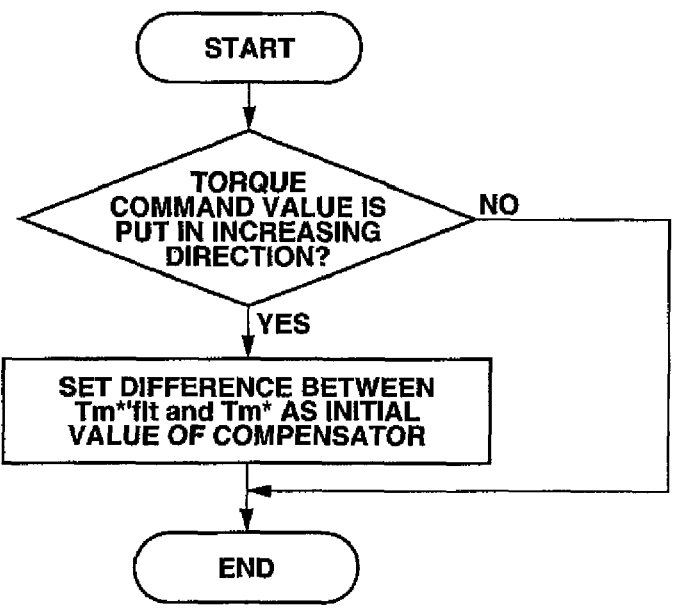
FIG. 20 is a flow chart of computation of the exemplary embodiment of FIG. 18.

FIG. 20 is a flow chart of the operation when executing the above control. As shown in FIG. 20, a judgment may be made as to whether or not the torque command value Tm* is put in the increasing direction. If the torque command value Tm* is put in the increasing direction, the difference between Tm*'flt and Tm* may be used as the initial value of the response enhancement compensator 23.

Ninth Exemplary Embodiment

Figure 21:
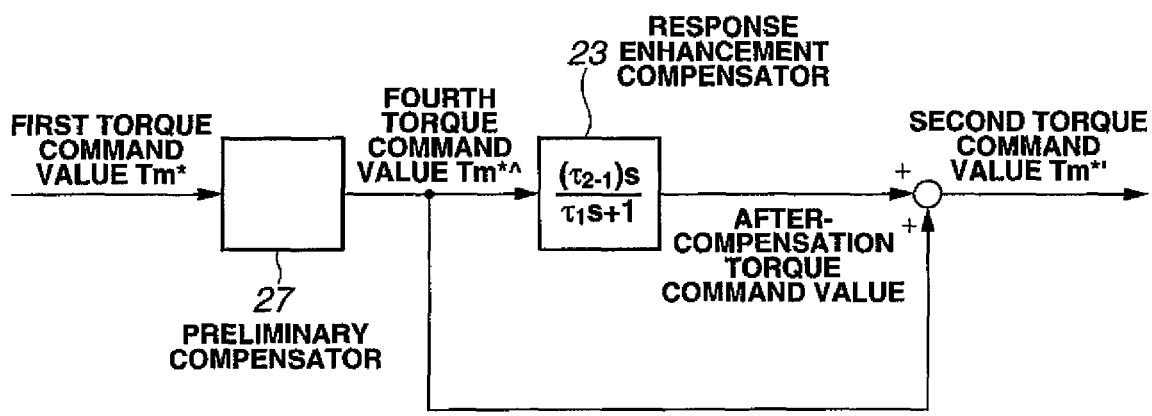
FIG. 21 is a block diagram showing an ninth exemplary embodiment in accordance with the present disclosure.

FIG. 21 is a block diagram showing an ninth exemplary embodiment in accordance with the present disclosure, which is other configuration that may prevent the temperature of the semiconductor device from exceeding the maximum junction temperature Tjmax completely when limiting the compensation for the torque or the current to only the positive side.

The above problem may arise due to the use of the limiter, as shown in FIG. 9. Because of this, in this embodiment, the limiter is not used, instead, to compensate for the second torque command value Tm*' only on the increasing side of the first torque command value Tm*, a new preliminary compensator (filter) 27 may be arranged in front of the response enhancement compensator 23.

The preliminary compensator 27 may change the first torque command value Tm* to an after-compensation fourth torque command value Tm*^, and may send it to the response enhancement compensator 23.

Figure 22:
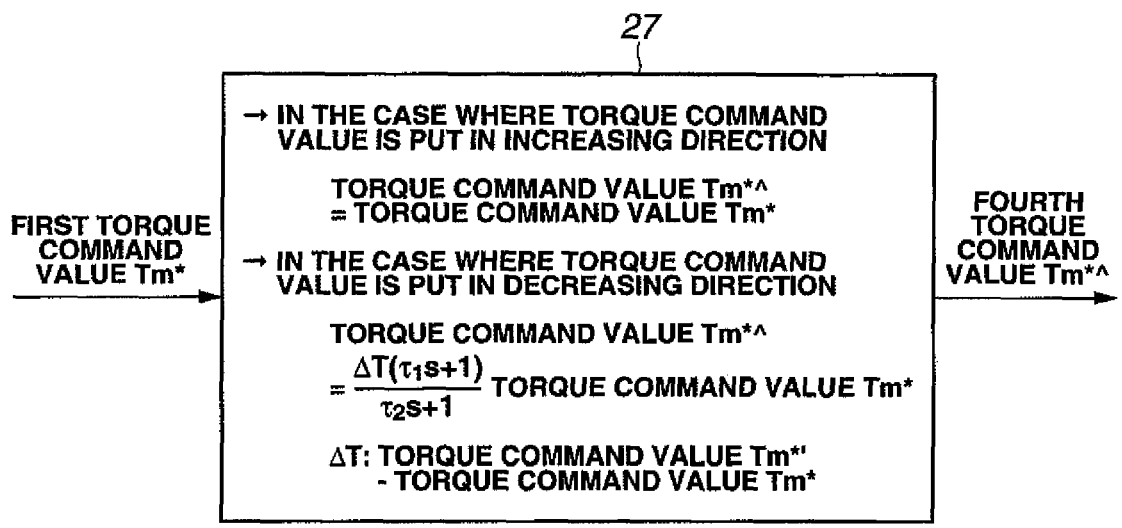
FIG. 22 is a drawing showing an operation of a preliminary compensator 27.

FIG. 22 is a drawing depicting an operation of the preliminary compensator 27.

As shown in FIG. 22, in the preliminary compensator 27, in the case of the torque increasing direction (i.e., a change in a direction in which the accelerator opening opens), the fourth torque command value Tm*^ may become the first torque command value Tm* (wherein the fourth torque command value Tm*^=the first torque command value Tm*). On the other hand, in the case of the torque decreasing direction (i.e., a change in a direction in which the accelerator opening closes), the fourth torque command value Tm*^ may be as follows.

$$Tm*^\wedge = Tm* \times \Delta T(\tau 1s+1)/(\tau 2s+1)$$

where, $\Delta T$ the second torque command value Tm*'−the first torque command value Tm*

Figure 23A:
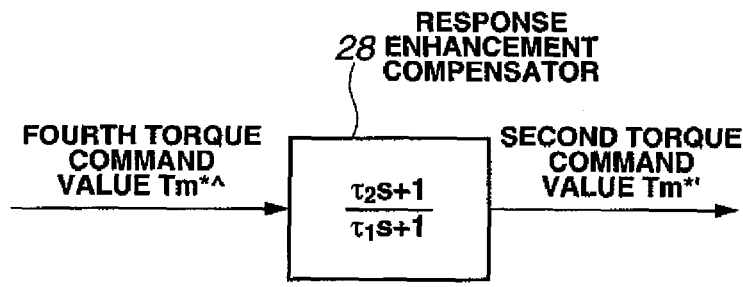
FIGS. 23A to 23C are drawings showing operating characteristics at time of torque increase and torque decrease, of the preliminary compensator.
Figure 23B:
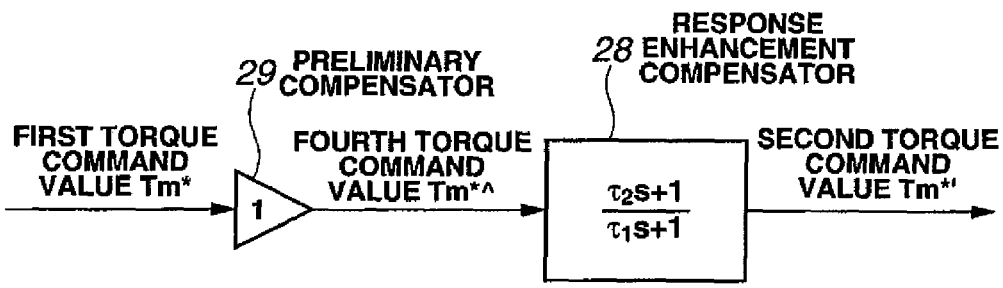
Figure 23C:
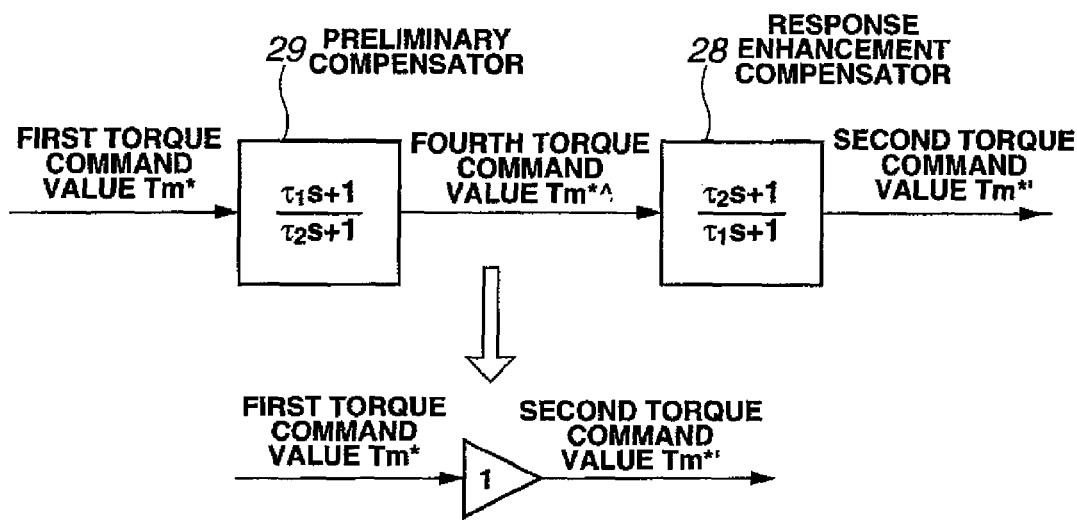

FIGS. 23A to 23C are drawings depicting operating characteristics at time of torque increase and torque decrease, of the preliminary compensator.

In the drawings, when the configuration of a response enhancement compensator 28 is shown by FIG. 23A, characteristic of a preliminary compensator 29 at the time of the torque increase may become equal to a circuit of amplification degree or ratio 1 as shown in FIG. 23B. That is, the input first torque command value Tm* may be output as it is and sent to the response enhancement compensator 28. Thus, in the case of the torque increase, the response enhancement compensator 28 may perform the increase compensation operation to the input first torque command value Tm* by the characteristic of the response enhancement compensator 28, and may output it as the second the torque command value Tm*'.

On the other hand, the characteristic of the preliminary compensator 29 at the time of the torque decrease may be a characteristic obtained by reversing the characteristic (by interchanging denominator and numerator) of the response enhancement compensator 28 as shown in FIG. 23C. Thus, the whole characteristic including the preliminary compensator 29 and the response enhancement compensator 28 may be equal to a circuit of amplification degree 1, and the input first torque command value Tm* may be output as it is as the second the torque command value Tm*'. That is, in this case, the compensation operation of the response enhancement compensator 28 may not function at all.

FIGS. 24A to 24D are characteristics depicting a torque response and a change in temperature of the semiconductor device, by the above control. From the top in the drawings, the first torque command value Tm*, the second torque command value Tm*', the temperature of the semiconductor device, and the fourth torque command value Tm*^ (the output of the preliminary compensator 27), are illustrated.

Figure 24A:
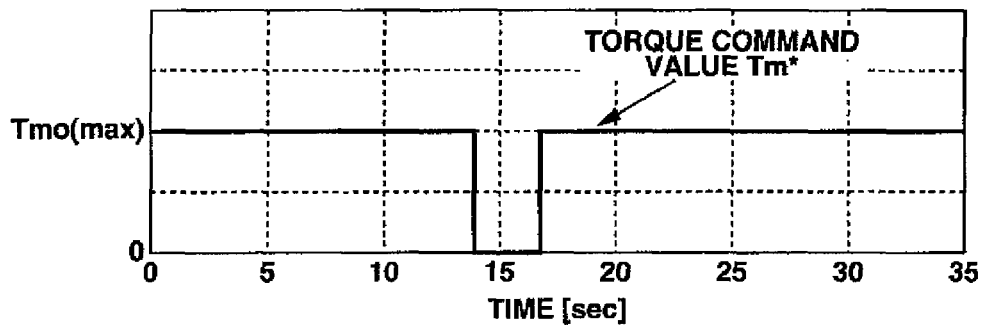
FIGS. 24A to 24D are characteristics showing a torque response and a change in temperature of the semiconductor device of the embodiment of FIG. 21.
Figure 24B:
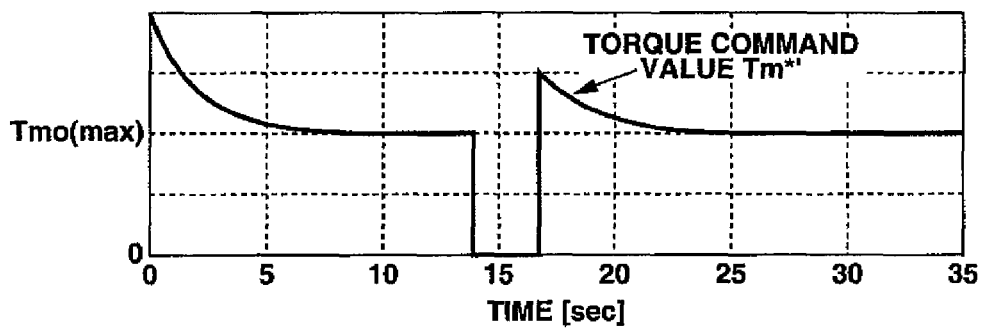
Figure 24C:
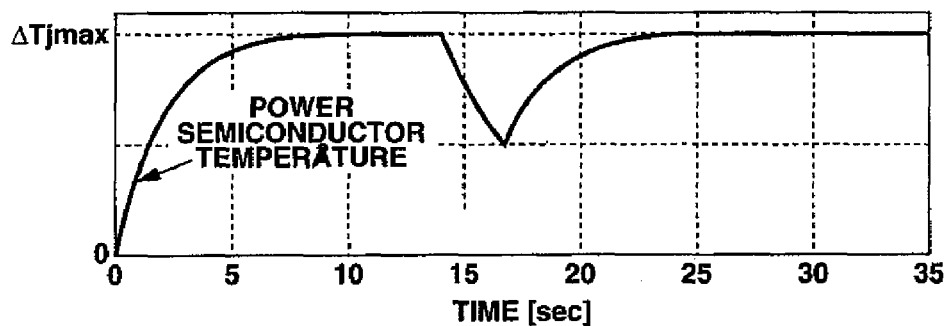
Figure 24D:
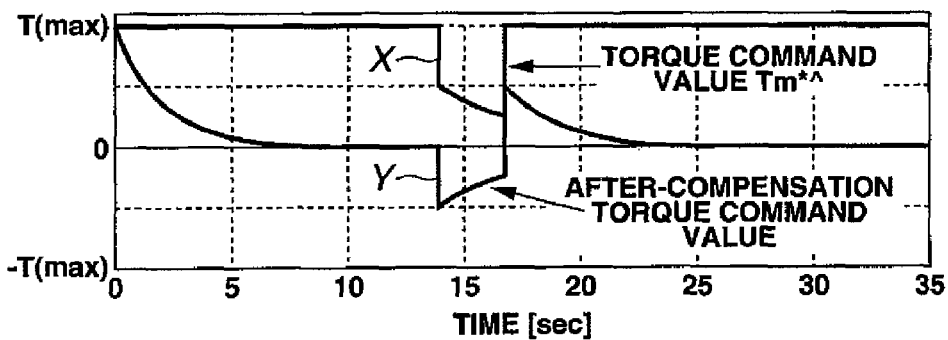

As shown in FIG. 24D, because the fourth torque command value Tm*^ may change as shown by a thick line X and the after-compensation torque command value may change as shown by a thin line Y, the compensation of the second torque command value Tm*' may only be performed on the increasing side of the first torque command value Tm*.

Tenth Exemplary Embodiment

FIG. 25 is a block diagram depicting a tenth exemplary embodiment in accordance with the present disclosure, and showing a manner in which the control is carried out on the basis of a loss of the semiconductor device instead of the torque.

In FIG. 25, a torque-loss converter or transducer 30 may be a transformation map having a relationship between the torque previously obtained by experiments on the basis of values such as the torque command value (current), the DC voltage and the rotation speed of the electric motor and the loss of the semiconductor device, then may transform the input torque command value into the loss.

A response enhancement compensator 31 may have the same operation as each response enhancement compensator explained so far. However, the control may be executed using the loss. This point is different.

A loss-torque converter or transducer 32 may be a device that performs a transformation opposite to the torque-loss transducer 30, then transforms an after-compensation loss value output by the response enhancement compensator 31 into the torque command value and outputs it.

In this way, also in the case where the control is carried out with the torque and current replaced with the loss of the semiconductor device, the same effects may be obtained. In addition, the torque command value (current) in the above explained embodiments may be replaced with the loss of the semiconductor device.

Advantageously, certain embodiments of the present disclosure provide a control apparatus of an electric motor which may be capable of improving acceleration performance in a case where an inverter and a motor having the same performance as normal ones are used.

To reach these advantages, in certain embodiments in accordance with the present disclosure, the control apparatus may be configured to pass or apply a modified current of a semiconductor device to the semiconductor device only for a predetermined period of time which may be fixed according to a transitional or transient characteristic of temperature increase of the semiconductor device that controls current of the electric motor, when an accelerator pedal is depressed.

Therefore, in certain embodiments in accordance with the present disclosure, because the greater current than the rated current may be passed or applied to the semiconductor device controlling the current of the electric motor without a breakdown of the semiconductor device, a torque produced at a time of transition such as abrupt acceleration may be increased, and the acceleration performance may be improved.

While the disclosure has been presented with respect to a limited number of embodiments, those skilled in the art, having benefit of this disclosure, will appreciate that other embodiments may be devised which do not depart from the scope of the present invention. Accordingly, the scope of the invention should be limited only by the attached claims.

What is claimed is:

1. An apparatus to control an electric motor to drive an electric-powered vehicle, the apparatus comprising:
   an accelerator position detector;
   a current controller to provide current to the electric motor through an inverter;

the current controller configured to control a semiconductor device of the inverter to operate the inverter in response to a detected accelerator position; and a torque compensator to supply the electric motor with a modified current of the semiconductor device;

wherein the torque compensator is configured to provide the modified current to the electric motor for a predetermined interval of time when the detected accelerator position exceeds a predetermined threshold, and wherein the modified current is greater than a rated current of the semiconductor device.

2. The apparatus to control an electric motor of claim 1, wherein the torque compensator is configured to provide the modified current to the electric motor at a predetermined interval of time in response to a temperature increase in the semiconductor device.

3. The apparatus to control an electric motor of claim 1, wherein:

the torque compensator is configured to set the predetermined interval of time according to a thermal time constant of the semiconductor device.

4. The apparatus to control an electric motor of claim 1, wherein:

the torque compensator is configured to increase and output a torque command value according to the detected accelerator position; and the torque compensator is configured to provide the modified current to compensate a torque of the electric motor.

5. The apparatus to control an electric motor of claim 4, wherein:

the torque compensator is configured to compensate the torque command value in an increasing direction.

6. The apparatus to control an electric motor of claim 4, further comprising:

a preliminary compensator arranged in a stage preceding the torque compensator, wherein the preliminary compensator is configured to limit the torque command value in an increasing direction.

7. The apparatus to control an electric motor of claim 1, wherein:

the torque compensator comprises a filter comprising a phase advance element.

8. The apparatus to control an electric motor of claim 7, wherein:

a time constant in a transfer function of a first-order advance element of the filter is set to be less than or equal to a time constant of a case where the temperature increase of the semiconductor device is approximated by a first-order lag.

9. The apparatus to control an electric motor of claim 7, wherein:

a time constant in a transfer function of a first-order lag element of the filter is set to be less than or equal to the product of, a ratio between a peak current set to a value that is greater than or equal to a rated current and smaller than a breakdown current of the semiconductor device and the rated current; and a time constant of a case where the temperature increase of the semiconductor device is approximated by the first-order lag.

10. The apparatus to control an electric motor of claim 7, wherein:

a time constant of the filter is configured to vary with changes in detected accelerator position.

11. The apparatus to control an electric motor of claim 7, wherein:

the torque compensator is configured to perform a filtering operation, equivalent to a temperature increase model of the semiconductor device, to an output of the filter;

the torque compensator is configured to subtract a resultant value of the filtering operation from the detected accelerator position; and the torque compensator is configured to use a resultant value of the subtraction as an initial value of the filter when a torque command value increases.

12. The apparatus to control an electric motor of claim 1, further comprising:

a vehicle speed detector;

wherein the torque compensator uses, as a characteristic when increasing and outputting a torque command value, at least one of an accelerator position function and a vehicle speed function.

13. The apparatus to control an electric motor of claim 1, further comprising:

a transducer configured to transform a torque command value set according to the detected accelerator position into a loss of the semiconductor device, and wherein the torque compensator is configured to compensate the torque of the electric motor according to the loss.

14. A method to control an electric motor of an electric-powered vehicle, the method comprising:

detecting an accelerator position of the vehicle;

controlling a current provided to the electric motor using an inverter comprising a semiconductor device;

controlling the current provided to the electric motor based upon the detected accelerator position;

compensating for a torque of the electric motor by providing the electric motor with a modified current of the semiconductor device for a predetermined period of time; and fixing the predetermined period of time according to a transitional characteristic of temperature increase of the semiconductor device when the detected accelerator position increases, wherein the modified current is greater than a rated current of the semiconductor device.

15. The method of claim 14, further comprising:

increasing and outputting a torque command value according to the detected accelerator position; and providing the modified current to compensate a torque of the electric motor.

16. An apparatus to control an electric motor to drive an electric-powered vehicle, the apparatus comprising:

an accelerator position detection means;

a current controlling means for providing current to the electric motor through an inverter;

the current controlling means configured to control a semiconductor device of the inverter for operating the inverter in response to a detected accelerator position; and a torque compensation means for supplying the electric motor with a modified current of the semiconductor means;

wherein the torque compensation means provides the modified current to the electric motor for a predetermined interval of time in response to a temperature increase in the semiconductor device when the detected accelerator position exceeds a predetermined threshold, and wherein the modified current is greater than a rated current of the semiconductor device.

17. The apparatus to control an electric motor of claim 16, wherein:
the torque compensation means is configured to set the predetermined interval of time according to a thermal time constant of the semiconductor means.

18. The apparatus to control an electric motor of claim 16, wherein:
the torque compensation means is configured to increase and output a torque command value according to the detected accelerator position; and
the torque compensation means is configured to provide the modified current to compensate a torque of the electric motor.

19. An apparatus to control an electric motor to drive an electric-powered vehicle, the apparatus comprising:
an accelerator position detector;
a current controller to provide current to the electric motor through an inverter;
the current controller configured to control a semiconductor device of the inverter to operate the inverter in response to a detected accelerator position;
a torque compensator to supply the electric motor with a modified current of the semiconductor device; and
a preliminary compensator arranged in a stage preceding the torque compensator,
wherein the torque compensator is configured to provide the modified current to the electric motor for a predetermined interval of time when the detected accelerator position exceeds a predetermined threshold,
wherein the torque compensator is configured to increase and output a torque command value according to the detected accelerator position,
the torque compensator is configured to provide the modified current to compensate a torque of the electric motor, and
wherein the preliminary compensator is configured to limit the torque command value in an increasing direction.

20. An apparatus to control an electric motor to drive an electric-powered vehicle, the apparatus comprising:
an accelerator position detector;
a current controller to provide current to the electric motor through an inverter;
the current controller configured to control a semiconductor device of the inverter to operate the inverter in response to a detected accelerator position; and
a torque compensator comprising a filter comprising a phase advance element to supply the electric motor with a modified current of the semiconductor device;
wherein the torque compensator is configured to provide the modified current to the electric motor for a predetermined interval of time when the detected accelerator position exceeds a predetermined threshold,
wherein a time constant in a transfer function of a first-order advance element of the filter is set to be less than or equal to a time constant of a case where the temperature increase of the semiconductor device is approximated by a first-order lag.

21. An apparatus to control an electric motor to drive an electric-powered vehicle, the apparatus comprising:
an accelerator position detector;
a current controller to provide current to the electric motor through an inverter;
the current controller configured to control a semiconductor device of the inverter to operate the inverter in response to a detected accelerator position; and
a torque compensator comprising a filter comprising a phase advance element to supply the electric motor with a modified current of the semiconductor device;
wherein the torque compensator is configured to provide the modified current to the electric motor for a predetermined interval of time when the detected accelerator position exceeds a predetermined threshold, and
wherein a time constant in a transfer function of a first-order lag element of the filter is set to be less than or equal to the product of:
a ratio between a peak current set to a value that is greater than or equal to a rated current and smaller than a breakdown current of the semiconductor device and the rated current; and
a time constant of a case where the temperature increase of the semiconductor device is approximated by the first-order lag.

22. An apparatus to control an electric motor to drive an electric-powered vehicle, the apparatus comprising:
an accelerator position detector;
a current controller to provide current to the electric motor through an inverter;
the current controller configured to control a semiconductor device of the inverter to operate the inverter in response to a detected accelerator position; and
a torque compensator comprising a filter comprising a phase advance element to supply the electric motor with a modified current of the semiconductor device;
wherein the torque compensator is configured to provide the modified current to the electric motor for a predetermined interval of time when the detected accelerator position exceeds a predetermined threshold, and
wherein:
the torque compensator is configured to perform a filtering operation, equivalent to a temperature increase model of the semiconductor device, to an output of the filter;
the torque compensator is configured to subtract a resultant value of the filtering operation from the detected accelerator position; and
the torque compensator is configured to use a resultant value of the subtraction as an initial value of the filter when a torque command value increases.

* * * * *